US012743071B2

(12) United States Patent
Kuipers et al.

(10) Patent No.: US 12,743,071 B2
(45) Date of Patent: Sep. 22, 2026

(54) BEAD WIDTH MANIPULATION AND CONTROL FOR ADDITIVE CONSTRUCTION OPERATIONS

(71) Applicant: United States of America as Represented by The Secretary of The Army, Alexandria, VA (US)

(72) Inventors: Kurtis A. Kuipers, Glastonbury, CT (US); Andrew A. Alleyne, Minneapolis, MN (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 473 days.

(21) Appl. No.: 18/373,183

(22) Filed: Sep. 26, 2023

(65) Prior Publication Data

US 2025/0103024 A1 Mar. 27, 2025

(51) Int. Cl.
*G05B 19/4099* (2006.01)

(52) U.S. Cl.
CPC .................... *G05B 19/4099* (2013.01); *G05B 2219/40293* (2013.01); *G05B 2219/49023* (2013.01)

(58) Field of Classification Search
CPC .................. G05B 19/4099; G05B 2219/40293
See application file for complete search history.

(56) References Cited

U.S. PATENT DOCUMENTS

2015/0321426 A1* 11/2015 Lee ........................ B33Y 50/02 425/150

* cited by examiner

*Primary Examiner* — Robert E Fennema
*Assistant Examiner* — William Xiang Zhang
(74) *Attorney, Agent, or Firm* — Brian C. Jones; Lawrence A. Schemmel

(57) ABSTRACT

In one embodiment, an additive construction method includes printing a calibration print out of a cement-based material using a 3D printer having a pump to pump the cement-based material and having a gantry operating at a gantry feed rate under control of an additive manufacturing software to dispense the cement-based material; measuring a bead width along a length of the calibration print; performing curve fitting on bead width measurements of the bead width to produce a calibration print process map that correlates the bead width of the calibration print to the gantry feed rate of the 3D printer to provide a calibration print correlation; and, if all of one or more desired bead widths for an additive construction print fall within the range of bead widths of the calibration print process map, using the calibration print correlation to modify bead width parameters of the additive manufacturing software for operating the 3D printer to perform bead width manipulation for the additive construction print.

20 Claims, 27 Drawing Sheets

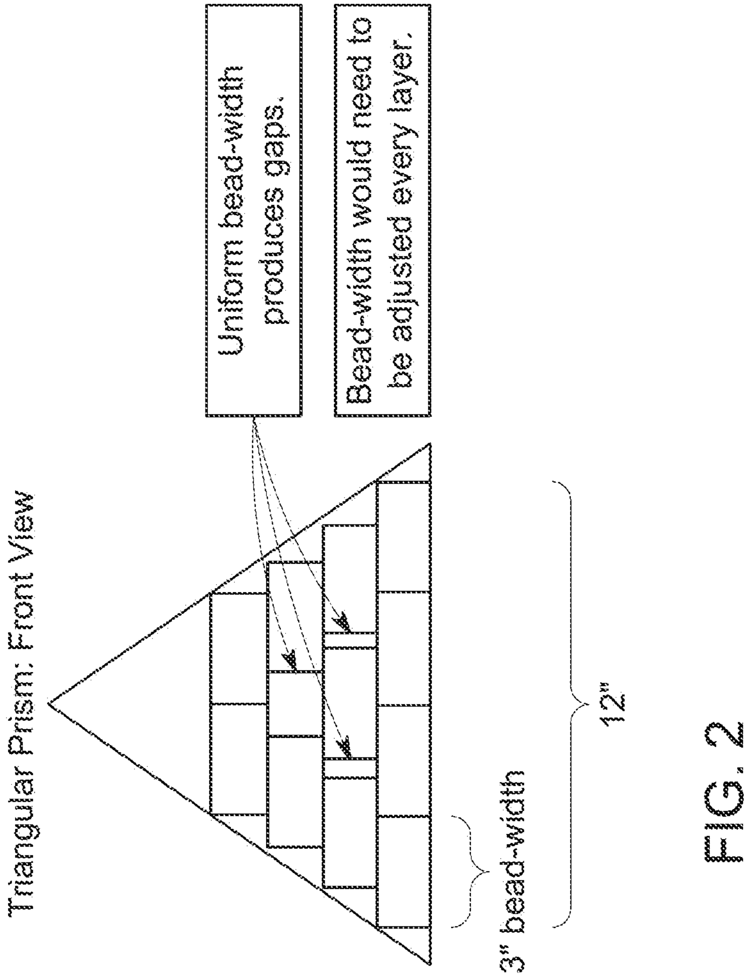
FIG. 2
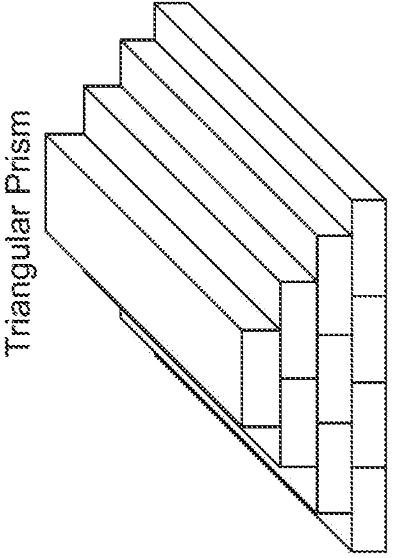

```
;
M03 S100;    50& pump speed
G00 X0  Y60 Z   1                 ;  Layer  1
F220 (Bead Diameter: 3.5)  ;
G01 X42 Y60 Z   1                 ;  Layer  1
F250 (Bead Diameter: 2.5)  ;
G01 X90 Y60 Z   1                 ;  Layer  1
F200 (Bead Diameter: 3. )  ;
G01 X144 Y60 Z   1                ;  Layer  1
M03 S0;  PUMP OFF
G00 Z10;
G00 Y40;
G00 X0;
G00 X12 Y41;
;
;                                        ;
G91                                      ;
G90                                      ;
                                         ;
M02                                      ;
```

Figure 22:
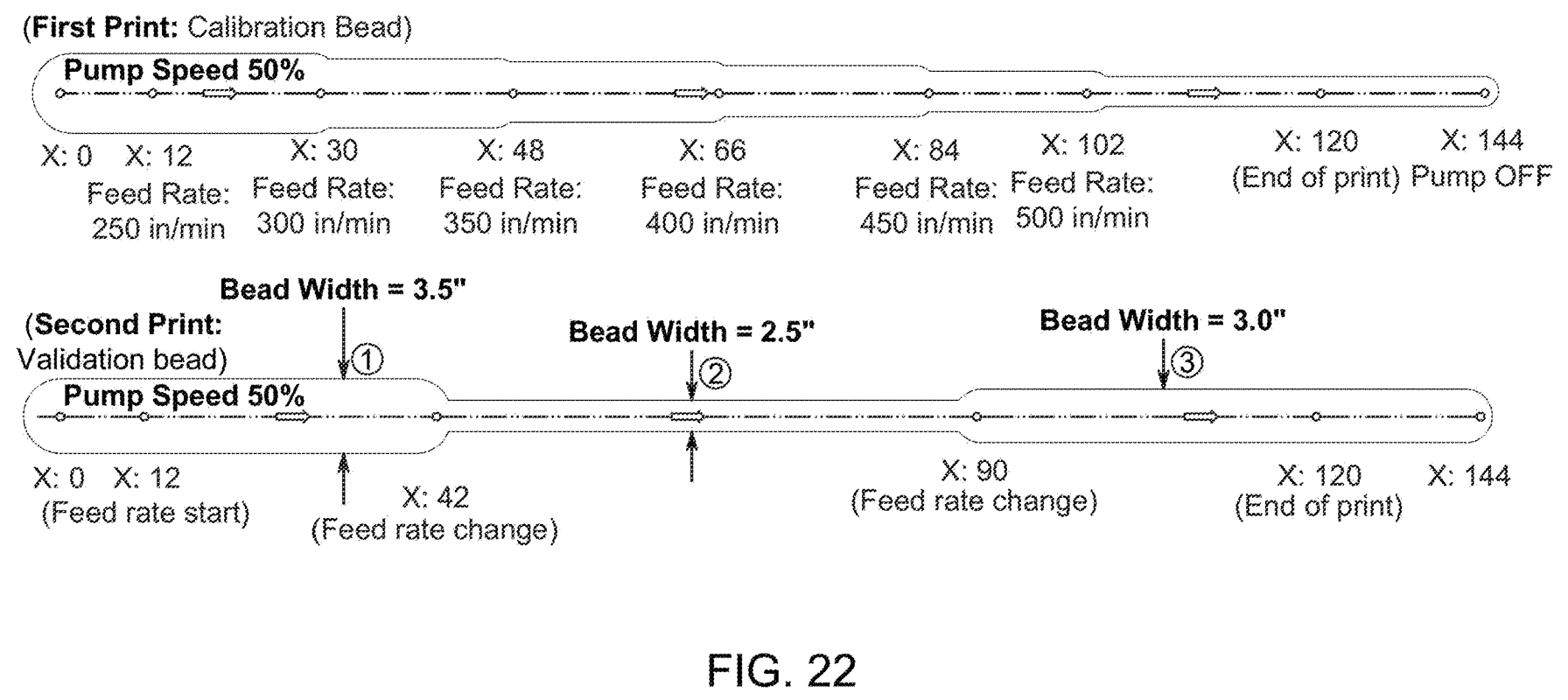

(First Print: Calibration Bead)

Pump Speed 50%

X: 0 X: 12 Feed Rate: 250 in/min

X: 30 Feed Rate: 300 in/min

X: 48 Feed Rate: 350 in/min

X: 66 Feed Rate: 400 in/min

X: 84 Feed Rate: 450 in/min

X: 102 Feed Rate: 500 in/min

X: 120 (End of print)

X: 144 Pump OFF

(Second Print: Validation bead)

Pump Speed 50%

Bead Width = 3.5" ①

Bead Width = 2.5" ②

Bead Width = 3.0" ③

X: 0 X: 12 (Feed rate start)

X: 42 (Feed rate change)

X: 90 (Feed rate change)

X: 120 (End of print)

BEAD WIDTH MANIPULATION AND CONTROL FOR ADDITIVE CONSTRUCTION OPERATIONS

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to systems and methods of controlling bead width for additive construction.

Description of the Related Art

This section introduces aspects that may help facilitate a better understanding of the invention. Accordingly, the statements of this section are to be read in this light and are not to be understood as admissions about what is prior art or what is not prior art.

Additive construction is the utilization of additive manufacturing techniques within the construction industry at construction-scale and includes a variety of printable materials including but not limited to cement-based materials, thermoplastics, clay, and metals. For purposes of this disclosure, additive construction is 3D printing with cement-based materials. Cement-based material is pumped through a hose, to a nozzle, and is deposited in a layer-by-layer fashion to manufacture an object.

Currently, an operator manually controls the concrete pump motor speed via a potentiometer and/or adjusts the gantry velocity with a pendant dial. This manual control method presents issues when attempting to print dimensionally accurate objects. For example, if it is desired to print a 2.5" thick outer shell to achieve a desired level of structural performance, there are no controls in place to ensure an accurate width. The problem is compounded by more unknowns during a printing operation including, for instance, different concrete mixtures, various weather conditions, and remote environments around the world.

SUMMARY

The present invention was developed to address the desire for robust control systems and methods to improve the accuracy and increase the automation capabilities of a manufacturing process involving large-scale additive manufacturing with cement-based materials.

Embodiments of the invention are directed to a control technique to manipulate the width of the extruded concrete bead while printing. A control system may be designed to work with a printer that is intended for use in expeditionary, military environments. The control technique generates a process map that correlates the width of the extruded concrete bead to the velocity of the gantry printer.

To accomplish this, a calibration print is designed that varies the gantry velocity along the print path and holds a constant pump speed. After the calibration print is printed, an advanced scanning apparatus is used to measure the bead width along the entire print. A process map is then generated from the resulting bead width measurements. From the process map, desired printing parameters are selected and input into the program that is used to drive the additive manufacturing machine, such as the G-code, to achieve the desired bead width. This method enables operators to select multiple bead widths to be implemented during the prints regardless of the rheological properties of the cement-based material that is being extruded.

The end result of this robust control system is the ability to manipulate the bead width during large-scale additive construction prints to within ±¼", on average. Furthermore, the entire process from the start of the calibration print to the implementation of new printing parameters is completed in less than 5 minutes.

According to an aspect the present invention, a method of additive construction, comprises: printing a calibration print out of a cement-based material using a 3-Dimensional (3D) printer having a pump to pump the cement-based material to the 3D printer and having a gantry operating at a gantry feed rate under control of an additive manufacturing software to dispense the cement-based material; measuring a bead width along a length of the calibration print; and performing curve fitting on bead width measurements of the bead width to produce a calibration print process map that correlates the bead width of the calibration print to the gantry feed rate of the 3D printer to provide a calibration print correlation, the calibration print process map including a range of bead widths between a minimum bead width and a maximum bead width alongside a best fit curve to the bead width measurements to provide the calibration print correlation. If all of one or more desired bead widths for an additive construction print fall within the range of bead widths of the calibration print process map, the method includes using the calibration print correlation to modify feed rate parameters of the additive manufacturing software for operating the 3D printer to perform bead width manipulation for the additive construction print. If any of the one or more desired bead widths for the additive construction print does not fall within the range of bead widths of the calibration print process map, the method includes modifying a pump speed of pumping the cement-based material to the 3D printer and repeating the printing, measuring, performing steps to produce a modified calibration print process map to provide a modified calibration print correlation until all of the one or more desired bead widths fall within the range of bead widths of the calibration print process map and one or more ranges of bead widths of one or more modified calibration print process maps, and using the calibration print correlation and one or more modified calibration print correlations of the one or more modified calibration print process maps to modify feed rate parameters of the additive manufacturing software for operating 3D printer to perform bead width manipulation for the additive construction print.

In accordance with another aspect of the invention, an electronic device has one or more processors and a memory storing one or more programs to be executed by the one or more processors. The one or more programs include instructions for: producing a calibration print process map that correlates a bead width of a calibration print to a gantry feed rate of a gantry of a 3-Dimensional (3D) printer to provide a calibration print correlation from curve fitting on bead width measurements of the bead width which have been measured along the length of the calibration print versus the gantry feed rate, for a calibration print of printing the calibration print out of a cement-based material using the 3D printer having the cement-based material pumped to the 3D printer and having the gantry operating at the gantry feed rate under control of an additive manufacturing software to dispense the cement-based material, the bead width having been measured along a length of the calibration print, the calibration print process map including a range of bead widths between a minimum bead width and a maximum bead width; if all of one or more desired bead widths for an additive construction print fall within the range of bead widths of the calibration print process map, using the calibration print correlation to modify feed rate parameters of the additive manufacturing software for operating the 3D printer to perform bead width manipulation for the additive construction print; and, if any of the one or more desired bead widths for the additive construction print does not fall within the range of bead widths of the calibration print process map, modifying a pump speed of pumping the cement-based material to the 3D printer and repeating the printing, measuring, performing steps to produce a modified calibration print process map to provide a modified calibration print correlation until all of the one or more desired bead widths fall within the range of bead widths of the calibration print process map and one or more ranges of bead widths of one or more modified calibration print process maps, and using the calibration print correlation and one or more modified calibration print correlations of the one or more modified calibration print process maps to modify feed rate parameters of the additive manufacturing software for operating the 3D printer to perform bead width manipulation for the additive construction print.

Yet another aspect of the invention is directed to a method for additive construction using an electronic device having a display device. The method comprises detecting user input to show a calibration print process map that correlates a bead width of a calibration print to a gantry feed rate of a gantry of a 3-Dimensional (3D) printer to provide a calibration print correlation, for a calibration print of printing the calibration print out of a cement-based material using the 3D printer having the cement-based material pumped to the 3D printer and having the gantry operating at the gantry feed rate under control of an additive manufacturing software to dispense the cement-based material, the bead width having been measured along a length of the calibration print; and, in response to detecting the user input the show the calibration print process map, displaying the calibration print process map which includes a range of bead widths from a minimum bead width and a maximum bead width of the calibration print, and the calibration print correlation from curve fitting on bead width measurements of the bead width which have been measured along the length of the calibration print versus the gantry feed rate. If all of the one or more desired bead widths for the additive construction print fall within the range of bead widths of the calibration print process map, the method includes detecting user input to change feed rate parameters for the additive construction print to be performed; and, in response to detecting the user input to change feed rate parameters, using the calibration print correlation to modify feed rate parameters of the additive manufacturing software for operating the 3D printer to perform bead width manipulation for the additive construction print. If any of the one or more desired bead widths for the additive construction print does not fall within the range of bead widths of the calibration print process map, the method includes receiving user input to modify the pump speed of pumping the cement-based material to the 3D printer for repeating: printing a modified calibration print out of the cement-based material, measuring a bead width along the length of the modified calibration print, performing curve fitting on bead width measurements of the bead width of the modified calibration print versus the gantry feed rate to produce a modified calibration print process map to provide a modified calibration print correlation, until all of the one or more desired bead widths fall within the range of bead widths of the calibration print process map and one or more ranges of bead widths of one or more modified calibration print process maps. The calibration print correlation and one or more modified calibration print correlations of the one or more modified calibration print process maps are used to modify feed rate parameters of the additive manufacturing software for operating the 3D printer to perform bead width manipulation for the additive construction print.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 2 shows an example of printing a triangular prism illustrating the difficulty of printing dimensionally accurate constructions.

FIG. 22 shows a diagram illustrating an example of a calibration print (First Print: Calibration Bead) and a diagram illustrating an example of a validation print (Second Print: Validation Bead) by adjusting the gantry feed rate as the result of changing the desired bead width from 3.5" to 2.5" to 3.0" according to the graphical plot of FIG. 18.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
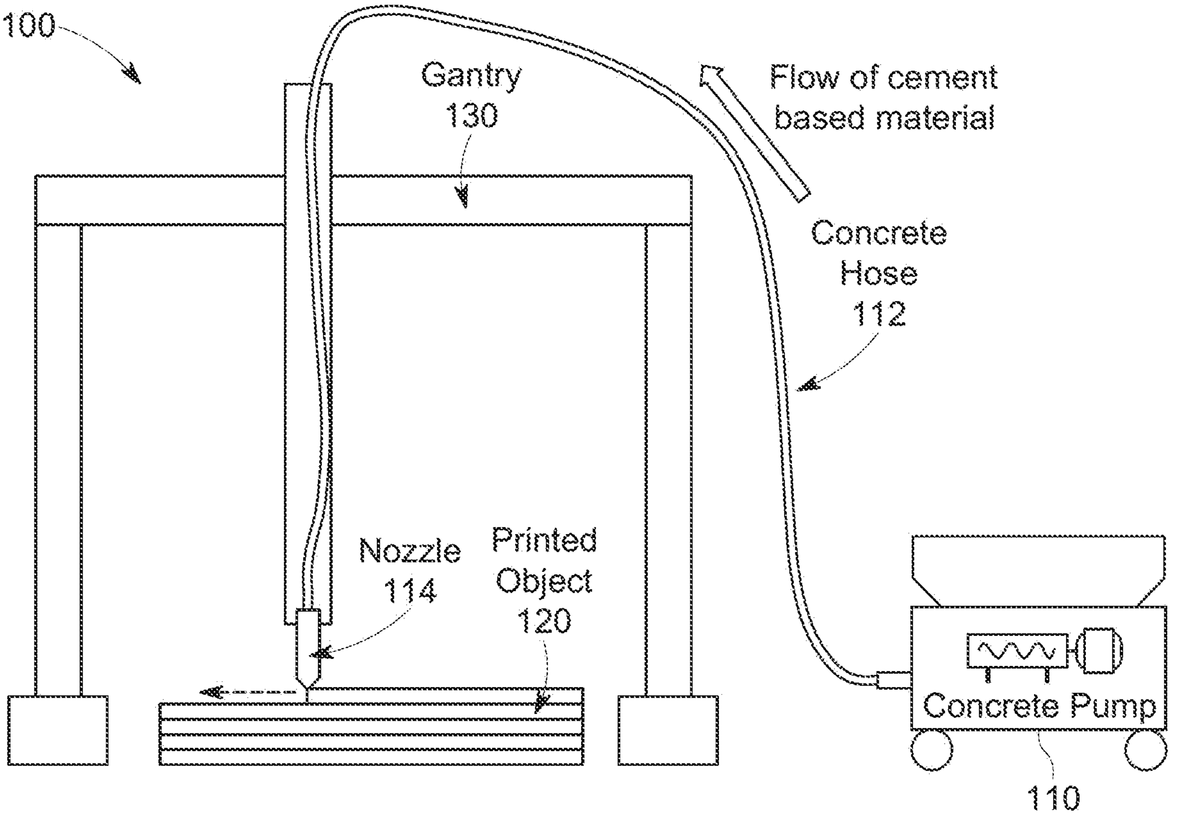
FIG. 1 is a schematic view illustrating an example of an additive construction apparatus for additive manufacturing in the construction industry. Additive construction is the utilization of additive manufacturing techniques within the construction industry to manufacture parts with volumes much greater than 1 $m^3$.

FIG. 1 is a schematic view illustrating an example of an additive construction apparatus 100 for additive manufacturing in the construction industry. The additive construction apparatus involves 3D printing in which a cement-based material is pumped by a pump 110 through a hose 112, to a nozzle 114, and is deposited in a layer-by-layer fashion to manufacture an object 120. A gantry 130 is used to move and drive the nozzle 114 to perform the 3D printing. An operator manually controls the concrete pump motor speed of the pump 110 via a potentiometer and/or adjusts the gantry velocity of the gantry 130 with a pendant dial to print the object 120. This manual control method presents issues when attempting to print dimensionally accurate constructions involving shapes other than simple ones of uniform dimensions.

FIG. 2 shows an example of printing a triangular prism illustrating the difficulty of printing dimensionally accurate constructions. Manual control of the pump speed and the gantry velocity generally keeps the bead for each pass at an unknown, uniform width. An attempt to print a triangular prism is a challenge because the total bead width will need to be adjusted at every layer and gaps are typically formed between the individual uniform bead width at each pass.

Figure 3:
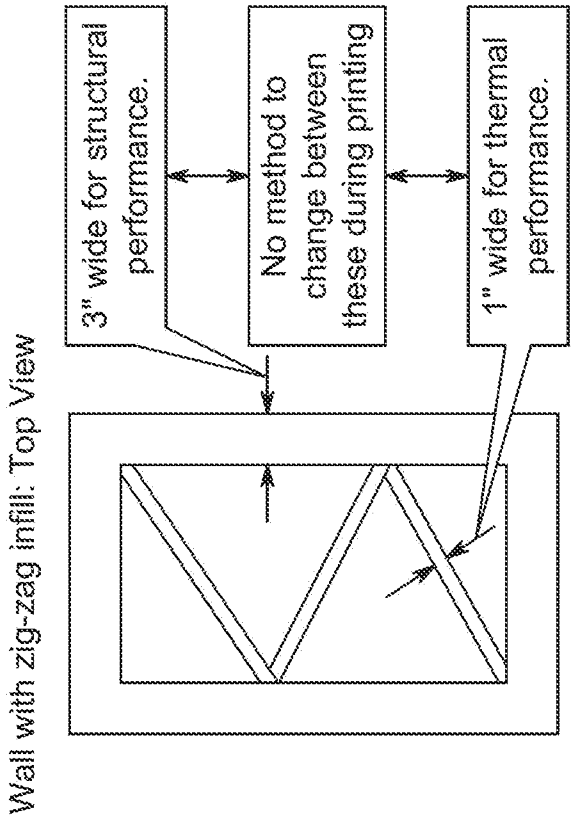
FIG. 3 shows an example of printing a wall with zig-zag infill illustrating the difficulty of printing dimensionally accurate constructions.
Figure 3:
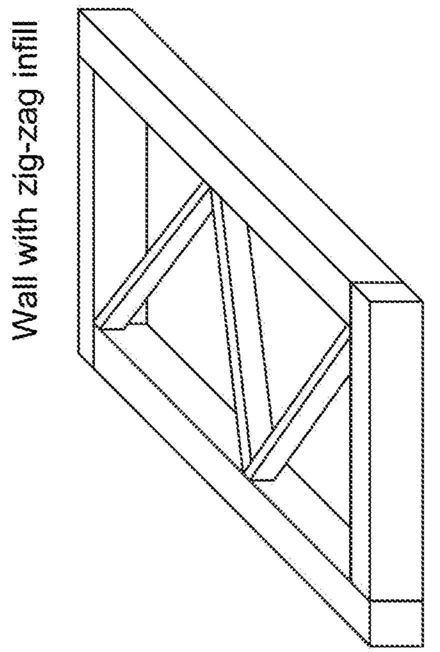

FIG. 3 shows an example of printing a wall with zig-zag infill illustrating the difficulty of printing dimensionally accurate constructions. The wall has a 3-inch wide frame for structural performance and 1-inch wide zig-zag infill for thermal performance. Manual control of the pump speed and the gantry velocity generally keeps the bead for each pass at an unknown, uniform width. There is no method to change the printing between the 3-inch wide frame and the 1-inch wide zig-zag infill. As such, manual control is incapable of printing a dimensionally accurate wall frame with zig-zag infill of different widths.

Figure 4:
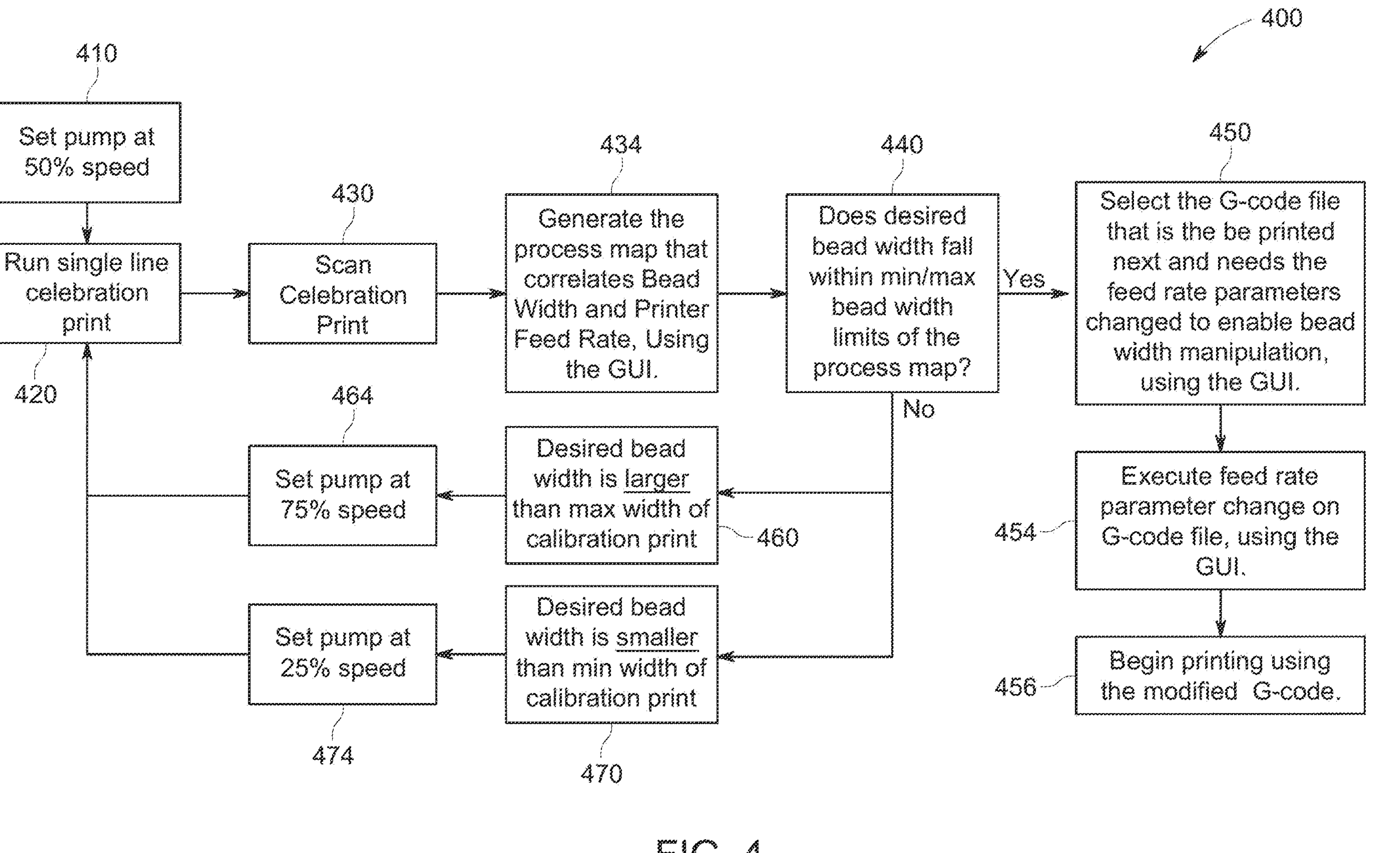
FIG. 4 is a flow diagram illustrating a bead width control method according to an embodiment.

FIG. 4 is a flow diagram 400 illustrating a bead width control method according to an embodiment. The control method involves the use of control software. CNC (Computer Numerical Control) software creates program instructions and codes that control CNC machines. CNC software can be broken into CAM (Computer Aided Manufacturing) software and CNC controller software. CAM refers to software that can be used to generate and simulate G-code for CNC machining operations. G-code (Geometry-code) is a widely used CNC and 3D printing programming language. It is used mainly in CAM to control automated machine tools as well as 3D-printer slicer applications.

In step 410, the concrete pump 110 is set at an intermediate speed, such as 50% of the top speed. A calibration print step 420 involves running a single line calibration print, i.e., using the additive construction apparatus 100 to print a single line calibration print. A scan step 430 involves scanning the calibration print to measure the bead width along the entire length of the calibration print. A calibration print process map is generated from the resulting bead width measurements in a process map step 434, for instance, by running a GUI (graphic user interface), that uses python scripts, to calculate the bead width versus gantry feed rate of the gantry 130.

In decision step 440 of FIG. 4, the method determines whether a preset desired or target bead width falls within the minimum bead width and the maximum bead width of the calibration print process map. If the answer is yes, the method selects the machine G-code to change the printing parameters (e.g., bead widths, gantry feed rates, etc.) in a parameter change step 450 to enable bead width manipulation for the next print. For example, from the process map, desired printing parameters are selected and input into the machine G-code to achieve the desired bead width in a parameter change execution step 454. Step 456 begins printing the next print using the modified G-code.

If the answer to step 440 is no, the desired bead width is either too small or too large. If the desired bead width is larger than the maximum bead width of the calibration print (in the process map) in step 460, the pump speed is increased, for instance, by increasing the speed of the concrete pump 110 from 50% to 75% of the top speed in step 464. If the desired bead width is smaller than the minimum bead width of the calibration print (in the process map) in step 470, the pump speed is decreased, for instance, by decreasing the speed of the concrete pump 110 from 505 to 25% of the top speed in step 474. The method repeats steps 410 to 440 and, if necessary, steps 460 to 474 in the return loop until the desired bead width falls within the minimum bead width and the maximum bead width of the calibration print process map in step 440.

Figure 5:
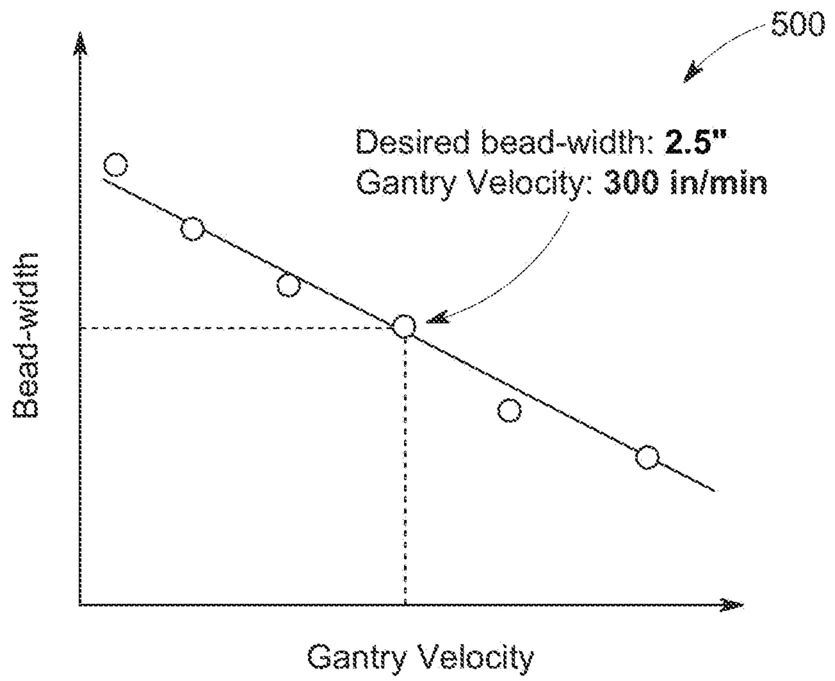
FIG. 5 shows a conceptual example of a calibration print process map in the form of a graphical plot of bead width versus gantry velocity which is generated by a calibration print and used for determining the gantry velocity to achieve a desired bead width in the control method of FIG. 4.

FIG. 5 shows a conceptual example of a calibration print process map 500 in the form of a graphical plot of bead width versus gantry velocity which is generated by a calibration print and used for determining the gantry velocity to achieve a desired bead width in the control method of FIG. 4. For instance, for a desired bead width of 2.5 inches, the selected gantry velocity is 300 in/min.

Figure 6A:
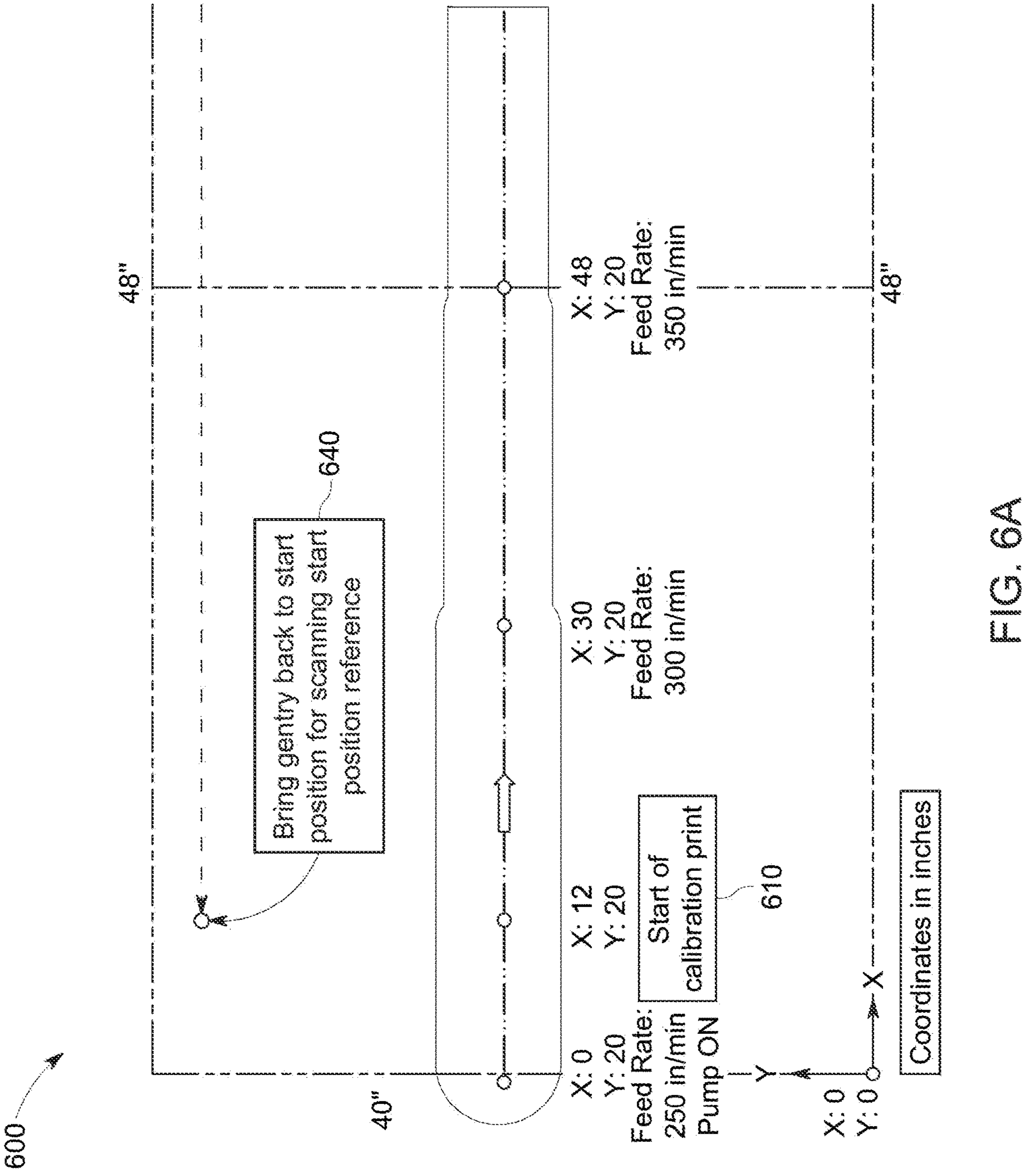
FIGS. 6A & 6B is a diagram illustrating an example of a single line calibration print generated in the calibration print step 420 of the control method of FIG. 4.
Figure 6B:
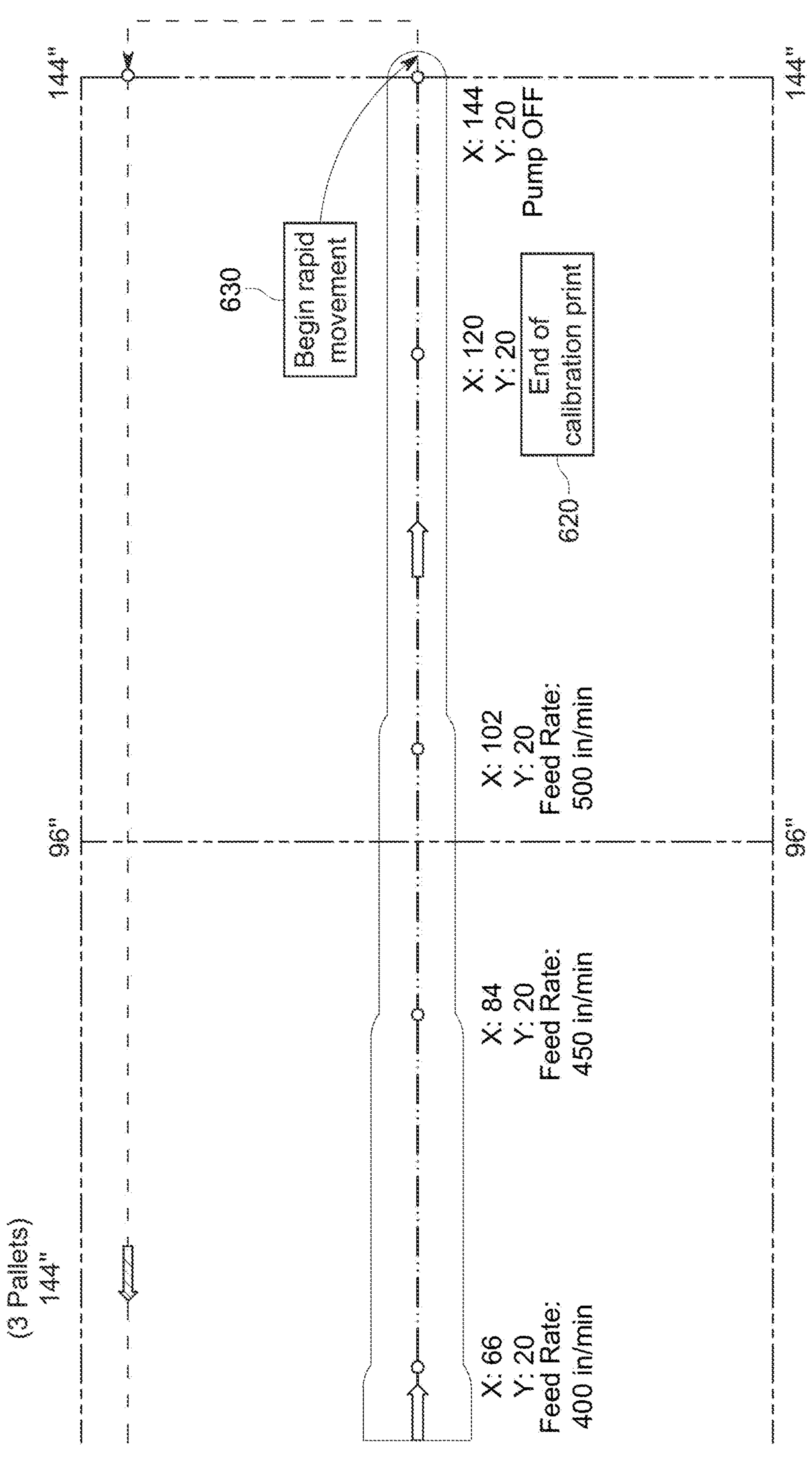

FIGS. 6A & 6B is a diagram 600 illustrating an example of a single line calibration print generated in the calibration print step 420 of the control method of FIG. 4. The gantry feed rate is set at 250 in/min at the start 610 of the calibration print. The feed rate increases incrementally until it reaches 500 in/min at the end 620 of the calibration print. The bead width decreases from the start 610 to the end 620 of the calibration print as a result of the increase in the feed rate. At the end 620 of the calibration print, the gantry 130 begins rapid movement at the end position 630 to bring the gantry 130 back to the start position 640 for scanning start position reference. The gantry 130 of the additive construction apparatus 100 is ready for the next printing step.

Figure 7A:
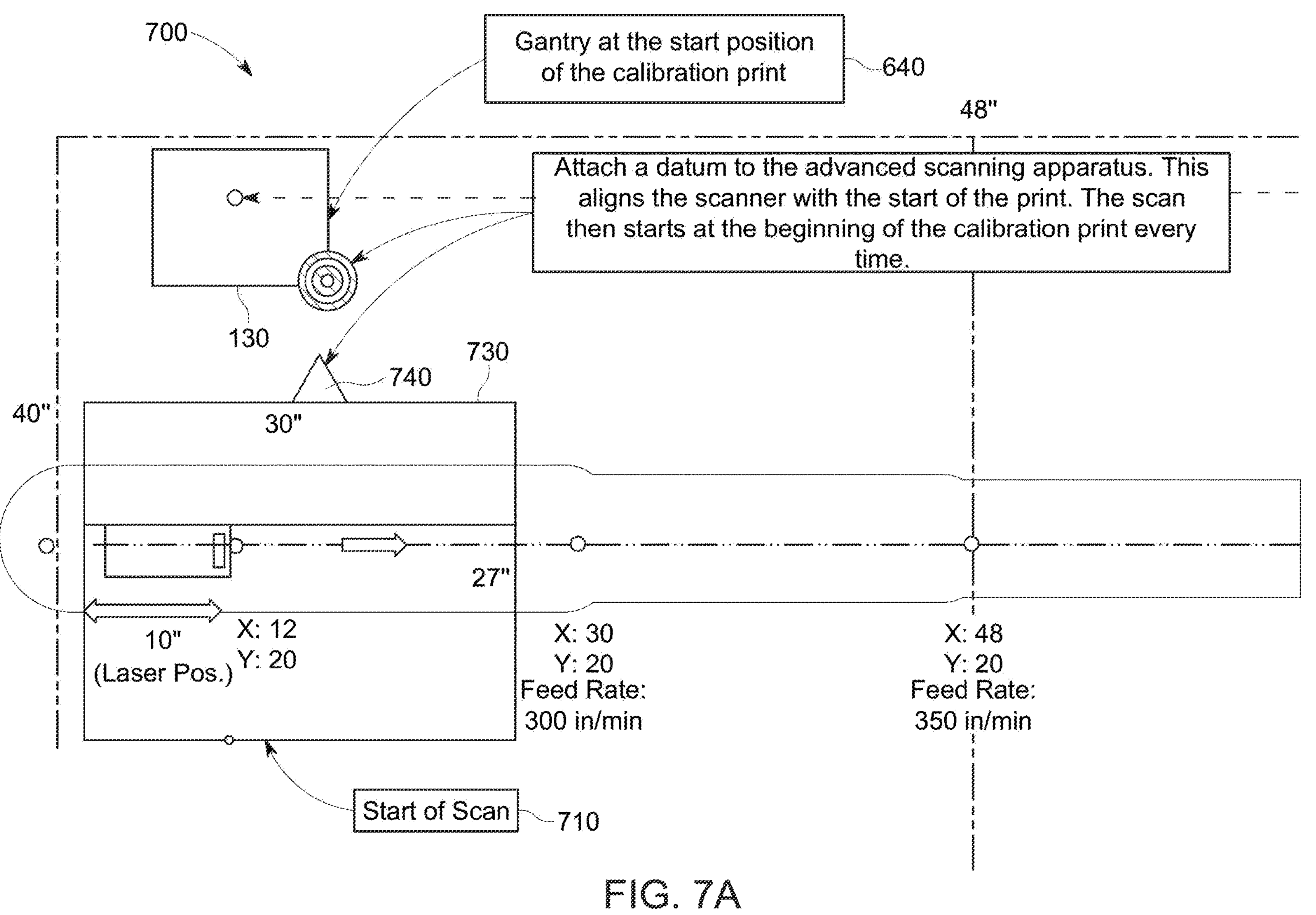
FIGS. 7A & 7B is a diagram illustrating an example of scanning of the calibration print of FIGS. 6A & 6B in the scan step 430 of the control method of FIG. 4.
Figure 7B:
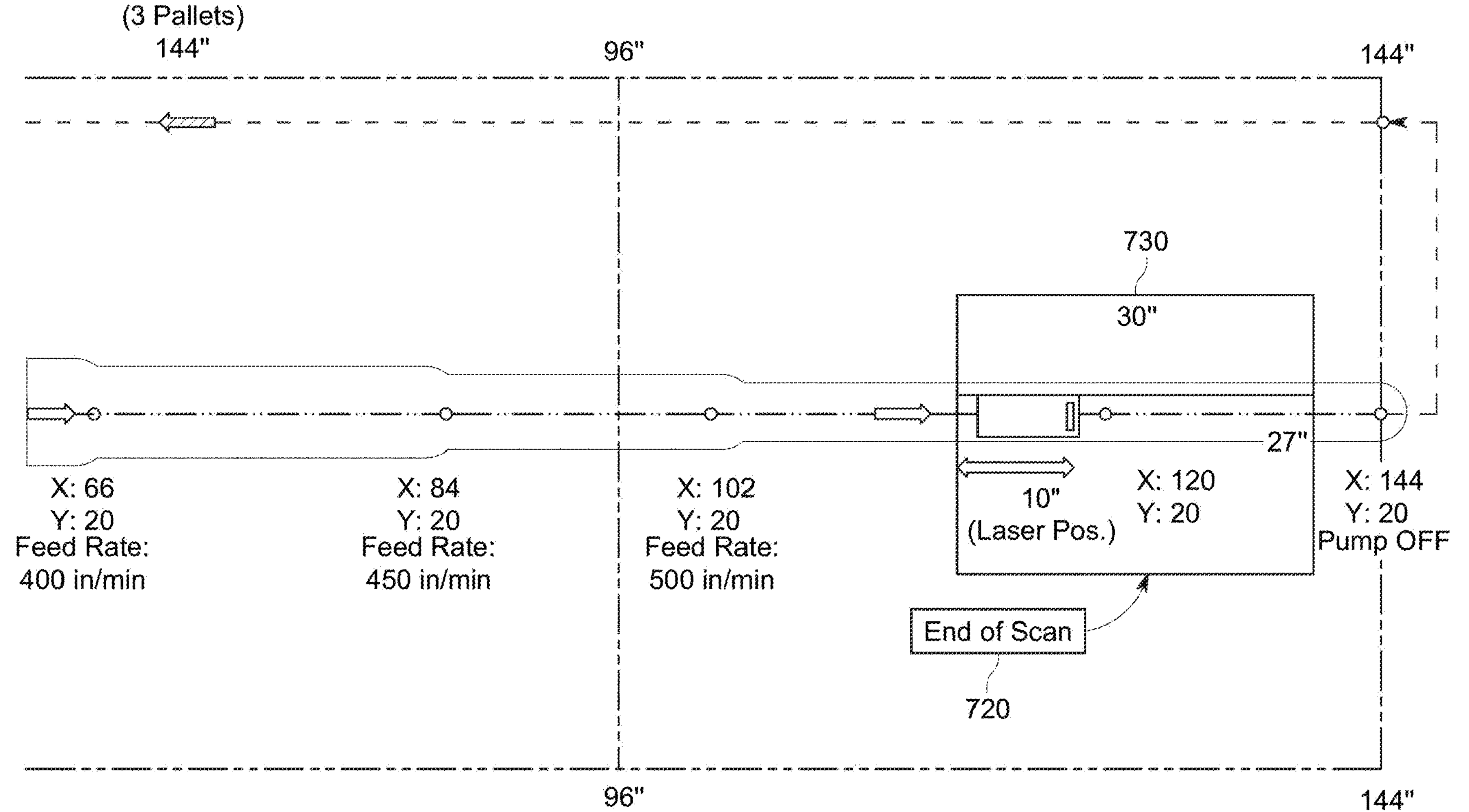

FIGS. 7A & 7B is a diagram 700 illustrating an example of scanning of the calibration print of FIGS. 6A & 6B in the scan step 430 of the control method of FIG. 4. At the start 710 of the scan, a scanning apparatus 730 is activated to scan the calibration print along its length until it reaches the end 720 of the scan. The gantry 130 is shown at the start position 640. At the start 710 of the scan, the scanning process attaches a datum 740 to the scanning apparatus 730. This aligns the scanning apparatus 730 with the start position 640 of the calibration print via the datum 740. The scan then starts at the scan start 710 aligned with the start position 640 of the calibration print every time.

Figure 8:
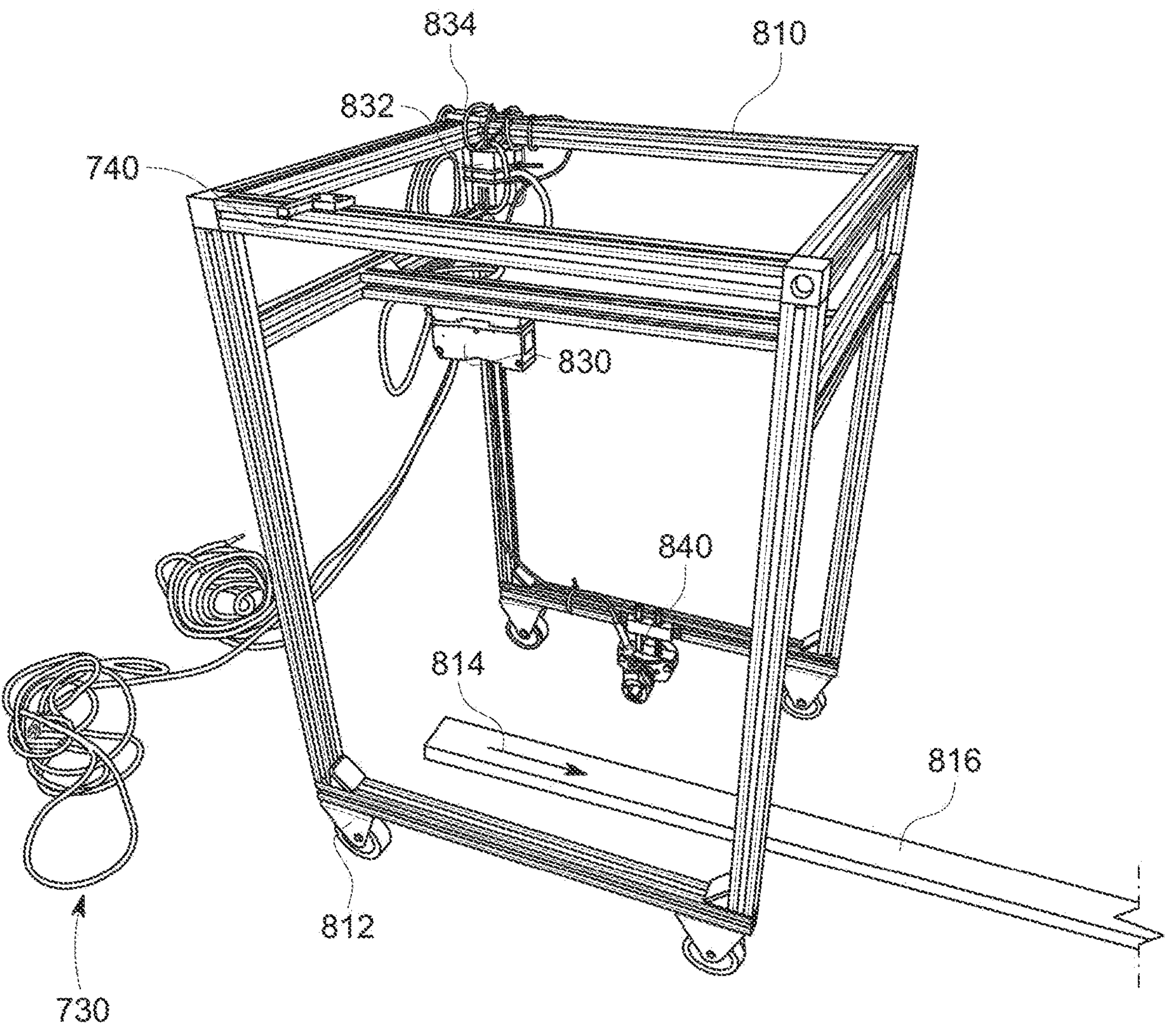
FIG. 8 is a perspective view of a scanning apparatus for the scanning in FIGS. 7A & 7B according to an embodiment.

FIG. 8 is a perspective view of a scanning apparatus 730 for the scanning in FIGS. 7A & 7B according to an embodiment. A frame 810 includes caster wheels 812 to facilitate movement of the frame along the scanning direction 814 for scanning the concrete bead 816 and back. A datum reference 740 is attached to the frame 810. The datum reference 740 is used to ensure that the position of the scanning apparatus 730 is set correctly before scanning. A scanner 830 such as a Cognex 3D scanner is mounted to the frame 810 with an AC-to-DC power supply 832 and a push button 834 for activation. In one example, a Cognex 3D-L4300 scanner uses blue laser optics to generate high resolution 3D point clouds. The scanner has an advanced camera that measures the profile of blue laser reflecting off the part that is being scanned to generate a 3D point cloud. An encoder apparatus 840 with wheel is mounted to the frame 810 to sense and provide feedback. The encoder and wheel combination measure distance similar to a surveyor's wheel but with much higher resolution. In specific embodiments, the 3D scanner 830 scans at intervals of distance (e.g., every 1 inch) along the entire length of the calibration print based on feedback from the encoder apparatus 840.

Figure 9:
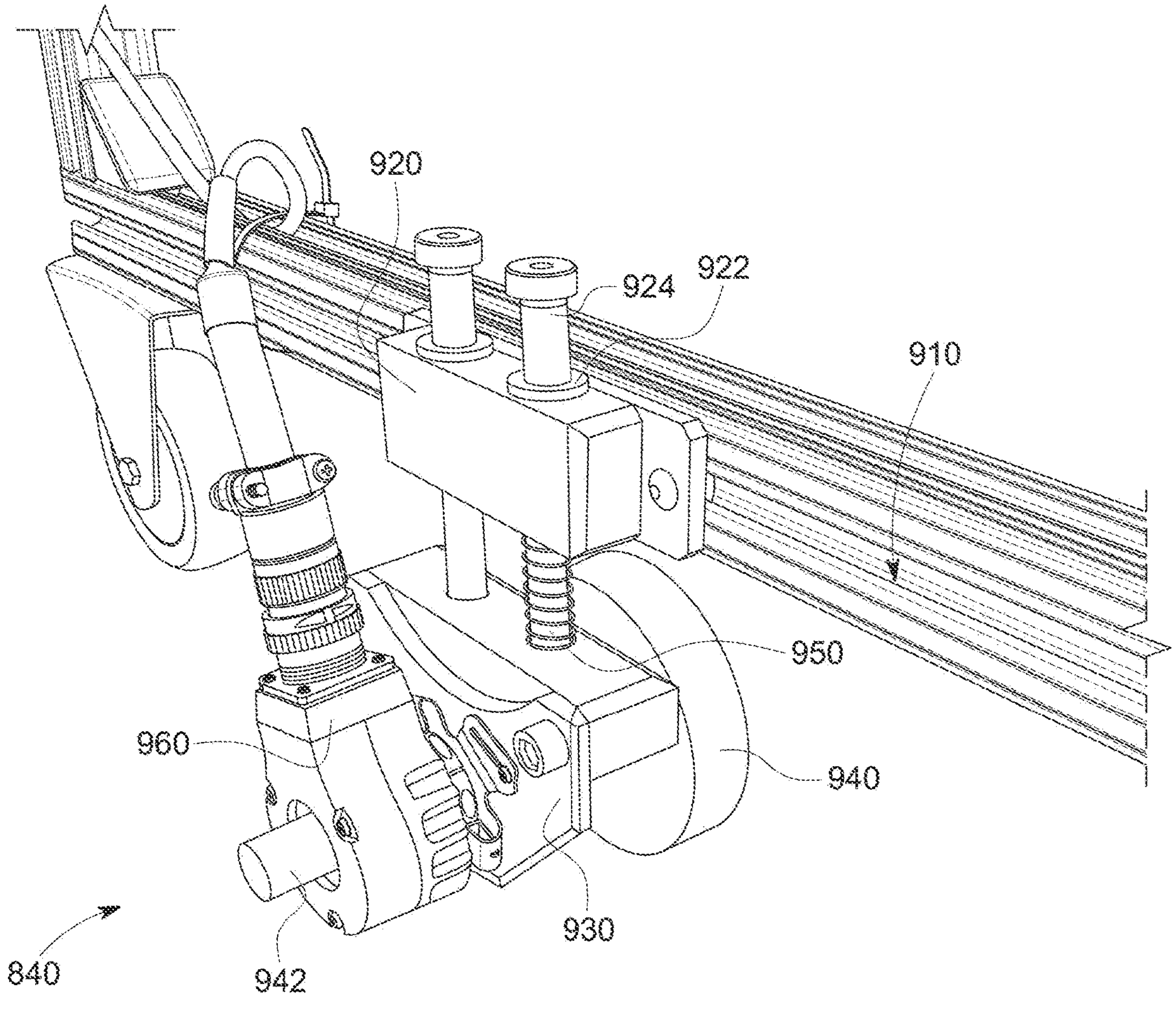
FIG. 9 is a perspective schematic view of an encoder apparatus in the scanning apparatus of FIG. 8.

FIG. 9 is a perspective schematic view of an encoder apparatus 840 in the scanning apparatus 730 of FIG. 8. The encoder apparatus 840 is mounted to the frame 810 (e.g., to a groove or rail 910 of the frame 810) via a first mounting block or upper mounting block 920. The first mounting block 920 has two linear bushings 922 disposed at two vertical apertures to receive two guide rods 924 disposed to move in linear motion vertically relative to the first mounting block 920. The guide rods 924 slidably couples the first mounting block 920 with a second mounting block or lower mounting block 930 to guide vertical motion of the second mounting block 930 relative to the first mounting block 920. An encoder wheel 940 is connected to the second mounting block 930 via a wheel shaft 942. A spring 950 such as a coil spring is mounted on one guide rod 924 in compression as a compression spring between the first mounting block 920 and the second mounting block 930. An encoder 960 such as a quadrature encoder is mounted to the second mounting block 930. The wheel shaft 942 connects the encoder 960 and the encoder wheel 940 through a bearing so they rotate together as the scanning apparatus 730 is pushed. To ensure the encoder wheel 940 keeps constant contact with the ground as it travels over uneven surfaces, the spring 950 is placed over a single guide rod 924 to provide consistent downward force onto the encoder bottom assembly which is the second mounting block 930 in FIG. 9. The guide rods 924 use the linear bushings 922 to allow for smooth up and down linear motion of the second mounting block 930 as it traverses uneven surfaces. The encoder 960 performs incremental encoding during scanning which includes sensing the direction of movement of the quadrature encoder 960 as the encoder 960 with the spring-loaded wheel 940 moves with the frame 810 and provides feedback to the scanner 830.

Figure 10:
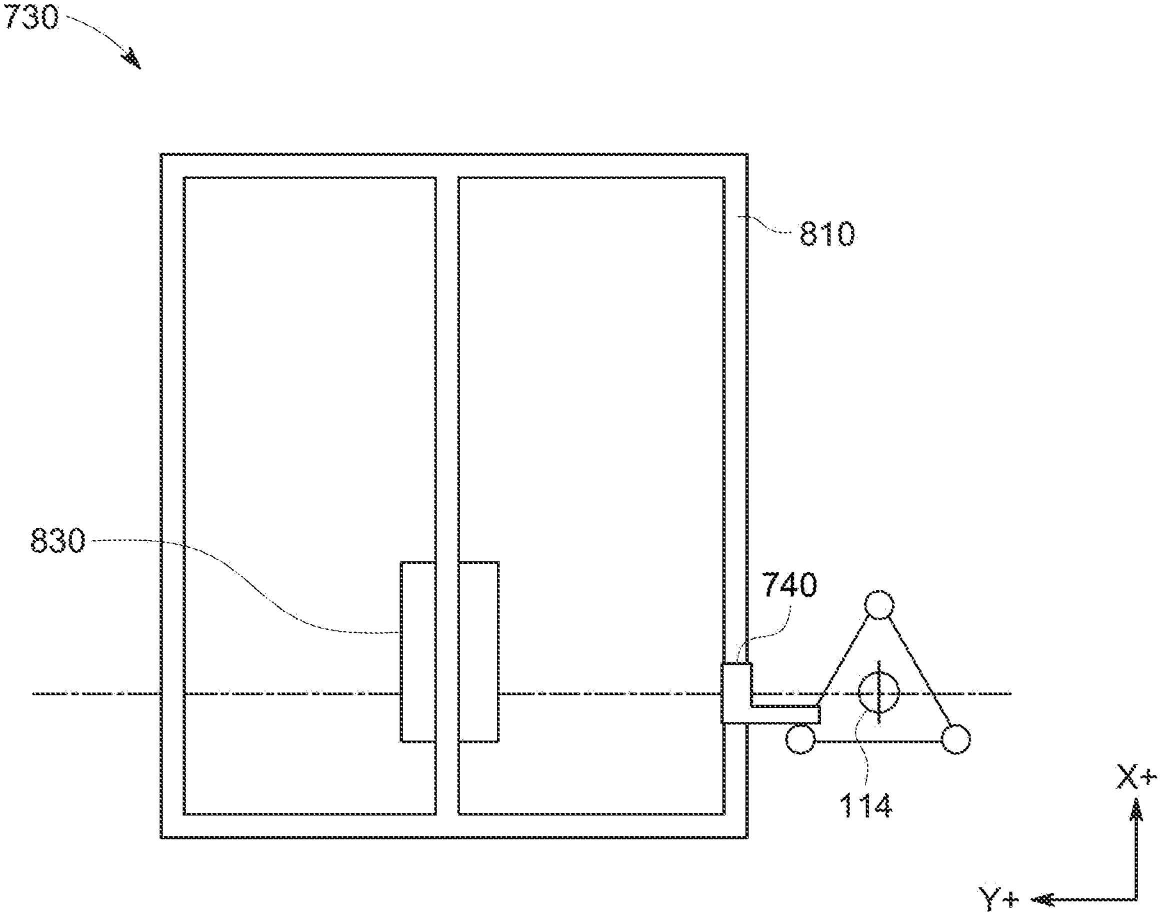
FIG. 10 is a top plan schematic view of the scanning apparatus of FIG. 8 during datum alignment before scanning. The scanning apparatus is placed at the beginning of a print bead before beginning scanning in step 430 of FIG. 4 and is located off of the Z-axis of the printer to provide a reliable start point.

FIG. 10 is a top plan schematic view of the scanning apparatus 730 of FIG. 8. The frame 810 includes the scanner 830 and the datum 740 attached thereto. The datum 740 aligns the start 710 of the scanning apparatus 730 with the start position 640 of the print. When the datum 740 is butted up against the Z-axis as shown, the center of the nozzle lines up with the laser plane from the scanner 830. This is used so that when an operator desires to begin a scan at a designated location on the printer's X-axis, the nozzle of the printer is moved to the desired X-coordinate. This makes it easy to start a scan right at the beginning of a print line at the exact X-coordinate at which the nozzle is currently located. The Y-coordinate of the printer is arbitrary as long as the datum 740 can contact the Z-axis. FIG. 10 shows the center of the nozzle 114 of the additive construction apparatus 100 oriented along the vertical Z-axis and in alignment with the scanner 830.

Figure 11:
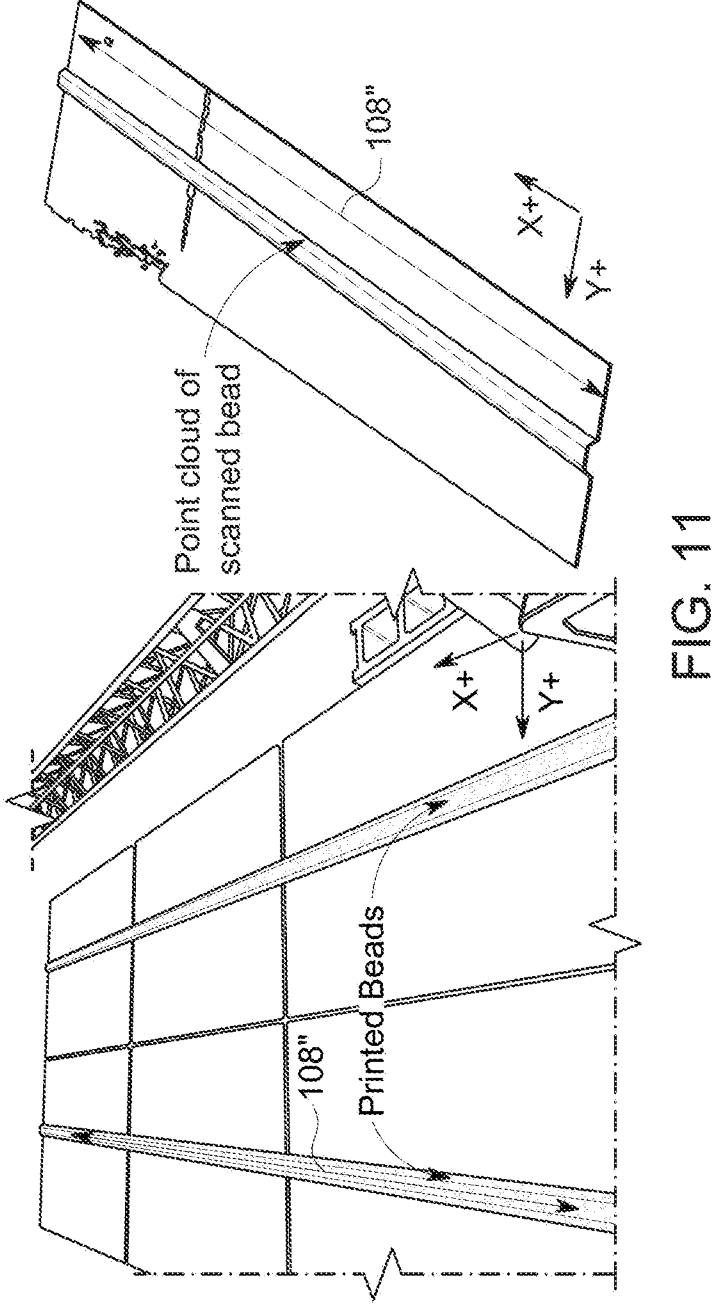
FIG. 11 illustrates an example of the point cloud generated from scanning the bead in the scanning step 430 of the control method of FIG. 4. The point cloud is comprised of smaller planar point clouds that are generated every 0.157" (4 mm) as shown in FIG. 12.

FIG. 11 illustrates an example of the point cloud generated from scanning the bead in the scanning step 430 of the control method of FIG. 4. The point cloud is comprised of smaller planar point clouds that are generated every 0.157" (4 mm) as shown in FIG. 12.

Figure 12:
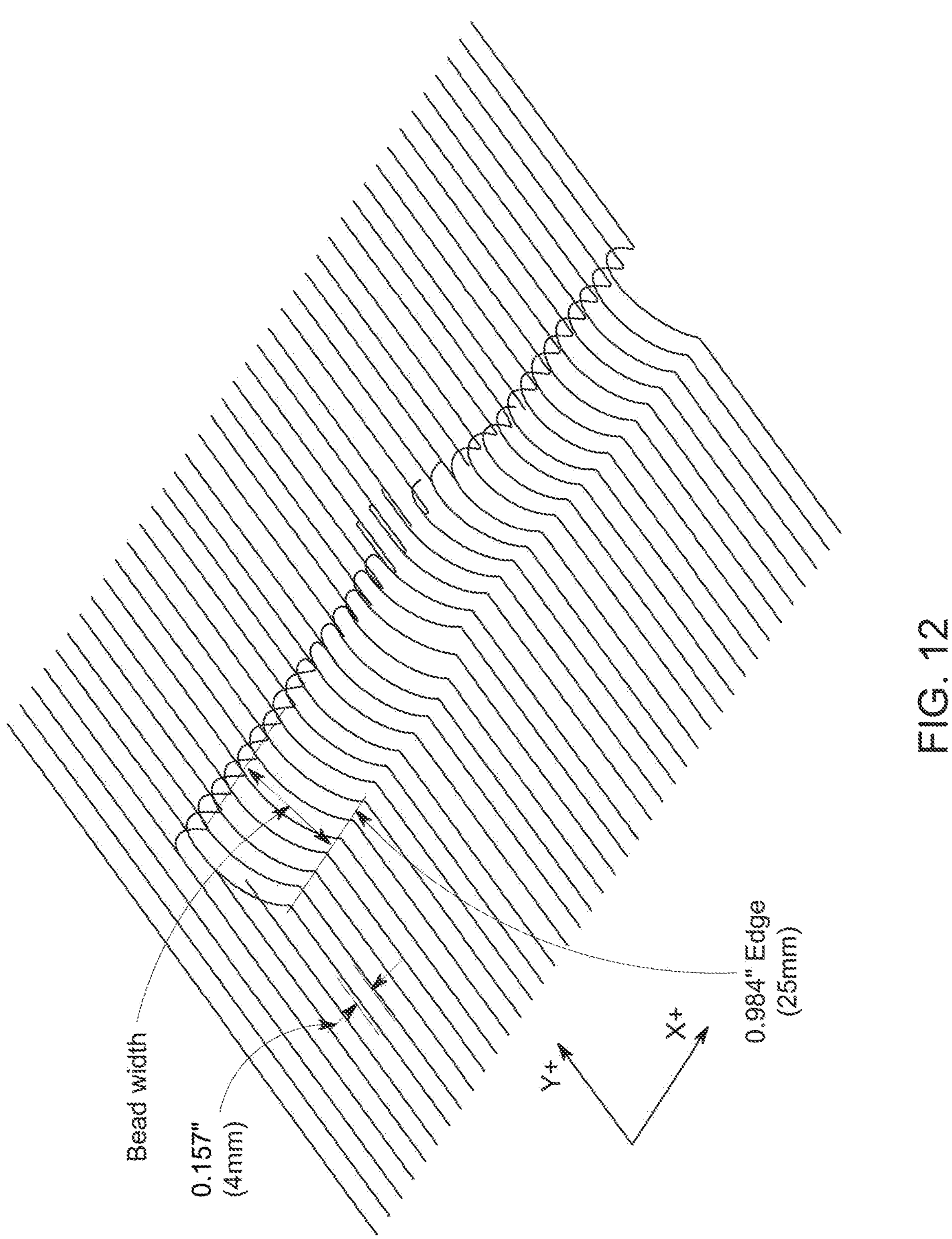
FIG. 12 illustrates an example of measuring the bead width based on the edge detection using the point cloud shown in FIG. 11. The software running on the 3D scanner is set to perform edge detection on 0.984" (25 mm) sections of the printed bead where it detects both outer edges of the bead and calculates the distance between the midpoints of each of the edge lines. This measurement is defined as the Bead Width and is repeated every 0.984" (25 mm) along the entire 108" scan of the calibration print.

FIG. 12 illustrates an example of measuring the bead width based on the edge detection using the point cloud shown in FIG. 11. After the entire length of the printed bead is scanned, the software running on the 3D scanner performs edge detection, for instance, on 0.984" (25 mm) sections of the printed bead. It generates two edges on both sides of the bead. The bead width is then measured by calculating the distance between the midpoints of each of the edge lines. This measurement is defined as the Bead Width and is repeated every 0.984" (25 mm) along the entire 108" scan. The result is an array of bead width measurements every 25 mm along the printed bead. In sum, the software running on the 3D scanner is set to perform edge detection on 0.984" (25 mm) sections of the printed bead where it detects both outer edges of the bead and calculates the distance between the midpoints of each of the edge lines.

Figure 13:
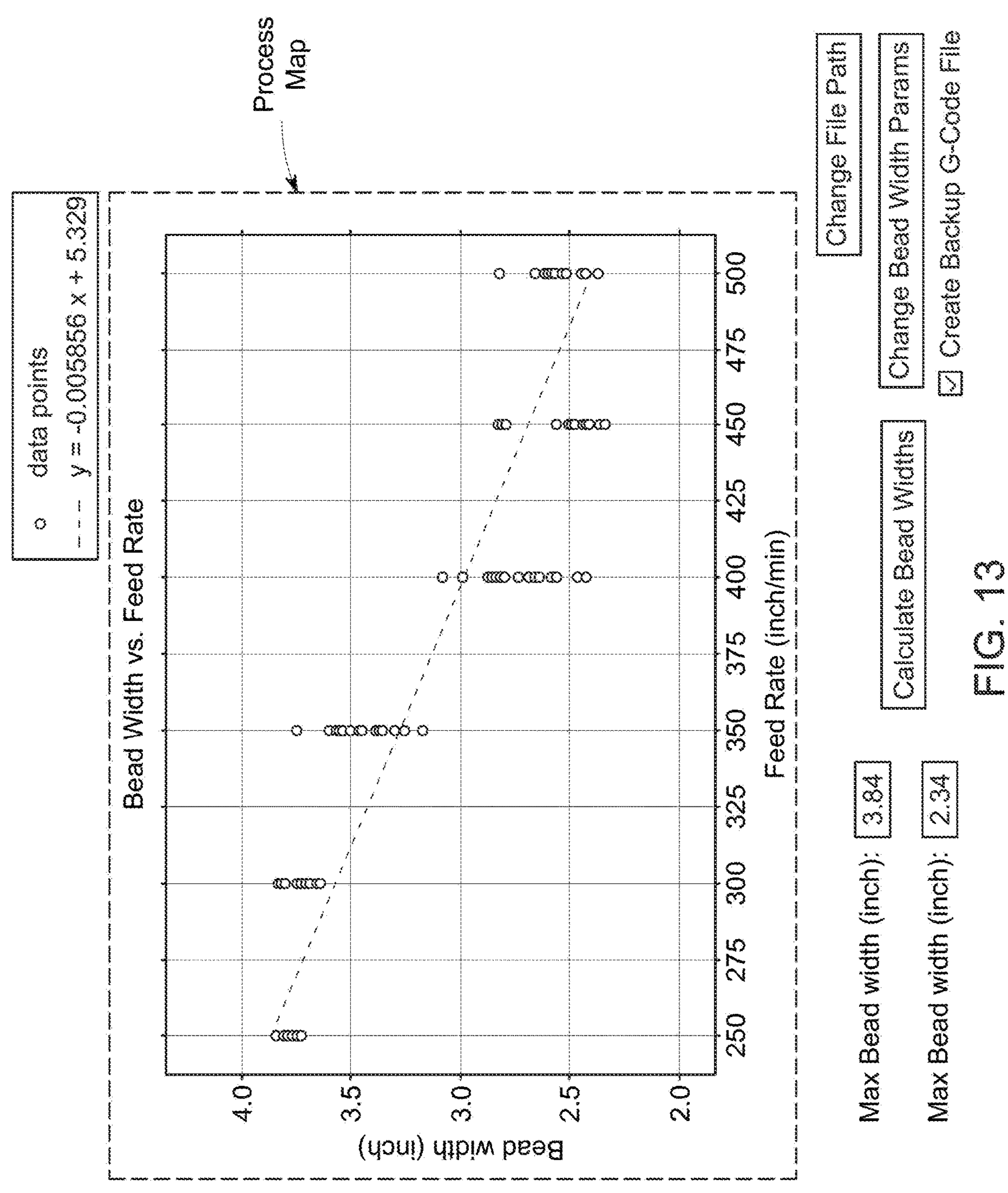
FIG. 13 is a graphical plot correlating the measured bead width and the gantry feed rate as an example of a process map generated in the process map step 434 in the control method of FIG. 4.

FIG. 13 is a graphical plot correlating the measured bead width and the gantry feed rate as an example of a process map generated in the process map step 434 in the control method of FIG. 4.

Figures 14, 15:
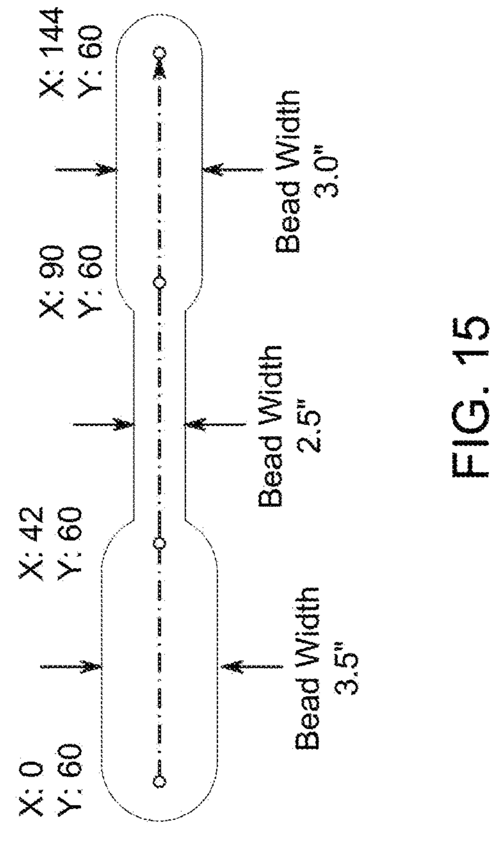
FIG. 14 is an example of how the desired bead width is specified within the G-code of the desired print that needs bead width manipulation.
FIG. 15 shows a top-down diagram of what print the G-code containing the desired bead width of FIG. 14 would produce.

FIG. 14 is an example of how the desired bead width is specified within the G-code of the desired print that needs bead width manipulation. The G-code is to be formatted with these comments to be used in the control method of FIG. 4. In FIG. 14, the desired bead width parameter or value, in inches, is specified as the numerical value within the parenthesis code comment. This comment is in the same line as the feed rate "F" parameter that it will modify according to the process map in FIG. 13 to achieve the desired bead width at the designated time during the print. FIG. 15 shows a top-down diagram of what print the G-code containing the desired bead width of FIG. 14 would produce.

Figure 16:
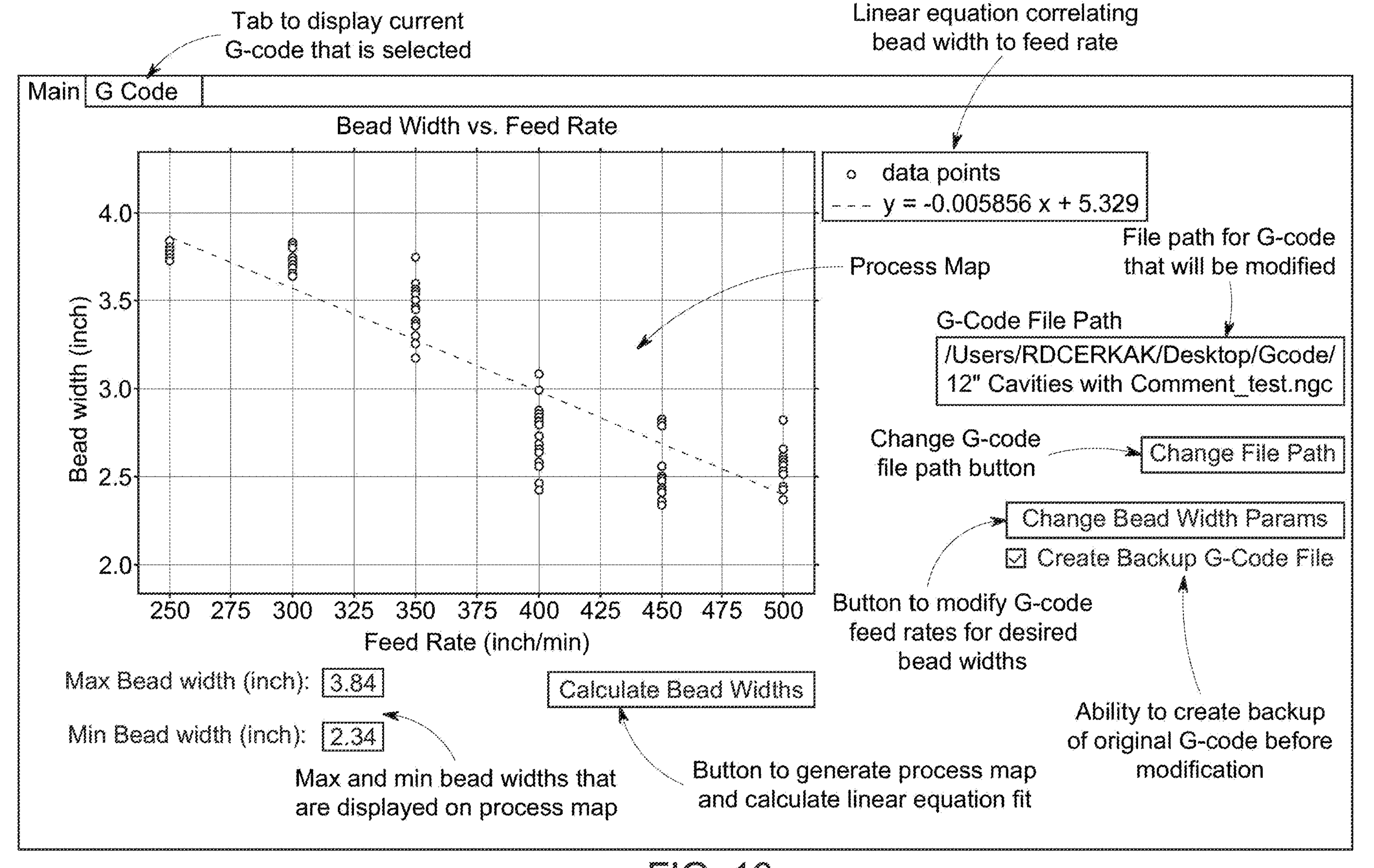
FIG. 16 shows an example of a graphic user interface (GUI) prompting the user to change the bead width parameters or values according to the process map obtained in the process map step 434 in the control method of FIG. 4.

FIG. 16 shows an example of a graphic user interface (GUI) prompting the user to change the bead width parameters or values according to the process map obtained in the process map step 434 in the control method of FIG. 4. At the top is a tab to display the current G-code that is selected. At the bottom are the maximum and minimum bead widths displayed on the process map. The GUI allows the operator to generate a process map with the single click of a "Calculate Bead Widths" button. After that button is clicked, the linear equation that correlates bead width to gantry velocity or feed rate is generated on the graph. From there, the G-code file path can be selected by clicking a "Change File Path" button to change the G-code file path. The G-code will then be populated in a "G-code file path" tab. Furthermore, a "Change Bead Width Params" button can be clicked to modify the G-code feed rates for desired bead widths. A "Create Backup G-Code File" checkbox can be selected to create backup of the original G-code before modification.

To change the feed rate in the G-code, the operator first generates the process map from the scanned calibration print data by clicking the "Calculate Bead Widths" button. This also calculates the minimum and maximum bead widths from the process map and the linear curve fit equation for the process map data. The operator then selects the correct G-code file that is to be modified by clicking the "Change File Path" button. After the G-code file as been selected, the "G code" tab on top is pressed to show the selected G-code. The operator can verify that the G-code is the desired G-code to be modified and that it has the correct desired bead widths indicated in the comments. Once the G-code has been verified, the G-code modification is initiated in the main tab. The operator will clock the "Change Bead Width Params" button to automatically change the feed rates in the G-code corresponding to the linear curve fit equation of the process map. The changed feed rates can be seen back in the 'G Code" tab. When a feed rate has been modified, the text "modded" is placed as a comment after the line to indicate the feed rate change has been made (see, e.g., FIG. 21).

Figure 17:
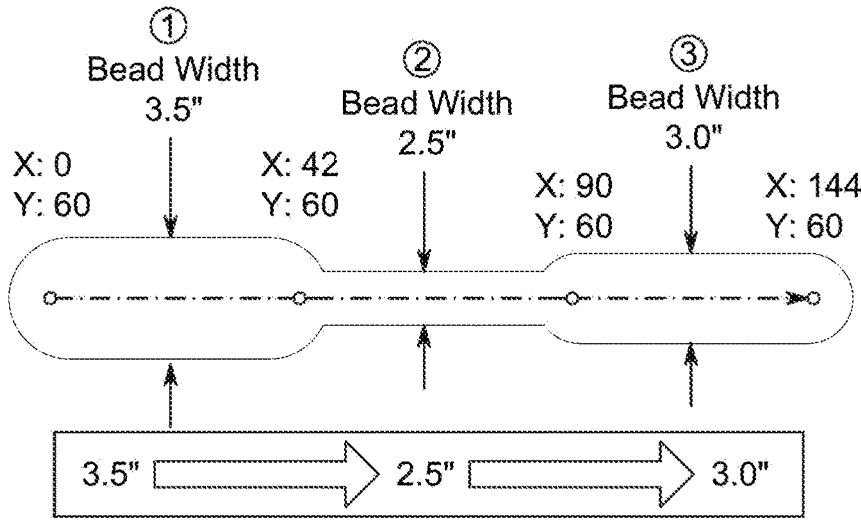
FIG. 17 is a top-down diagram illustrating an example of a changing bead width.

FIG. 17 is a top-down diagram illustrating an example of a desired bead width.

Figure 18:
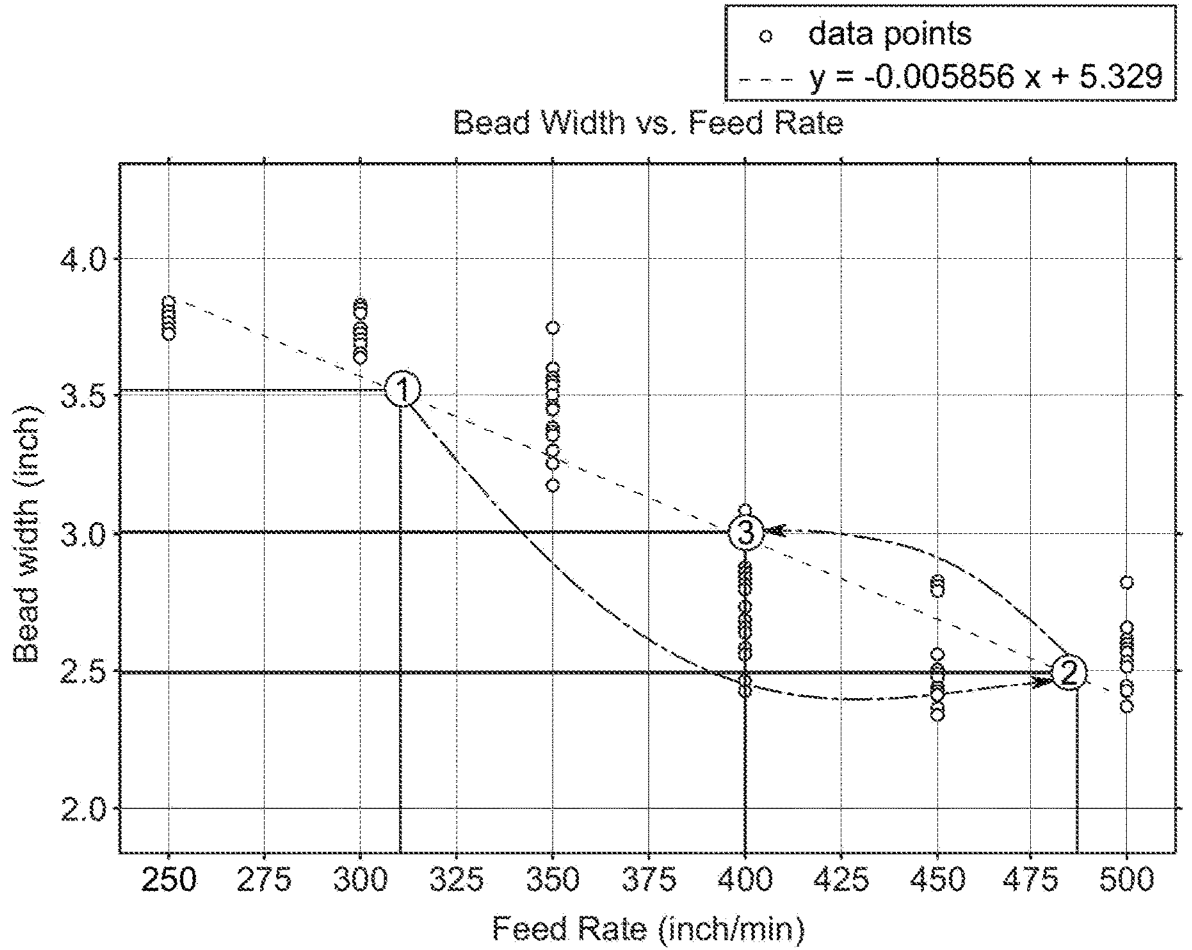
FIG. 18 is a graphical plot of bead width versus gantry feed rate illustrating an example of adjusting or modifying the gantry feed rate as a result of changing the desired bead width.

FIG. 18 is a graphical plot of bead width versus gantry feed rate illustrating an example of adjusting or modifying the gantry feed rate as a result of changing the desired bead width. In FIG. 17, in the example shown, the desired bead width changes from 3.5" to 2.5" to 3.0" during the print. The desired bead width is first to be set at 3.5" then it is set to 2.5" in the middle of the print and finally is set to 3.0". The process map in FIG. 18 maps out what this process would look like with changing feed rates. FIG. 17 shows a changing bead width according to the process map of FIG. 18.

Figure 19:
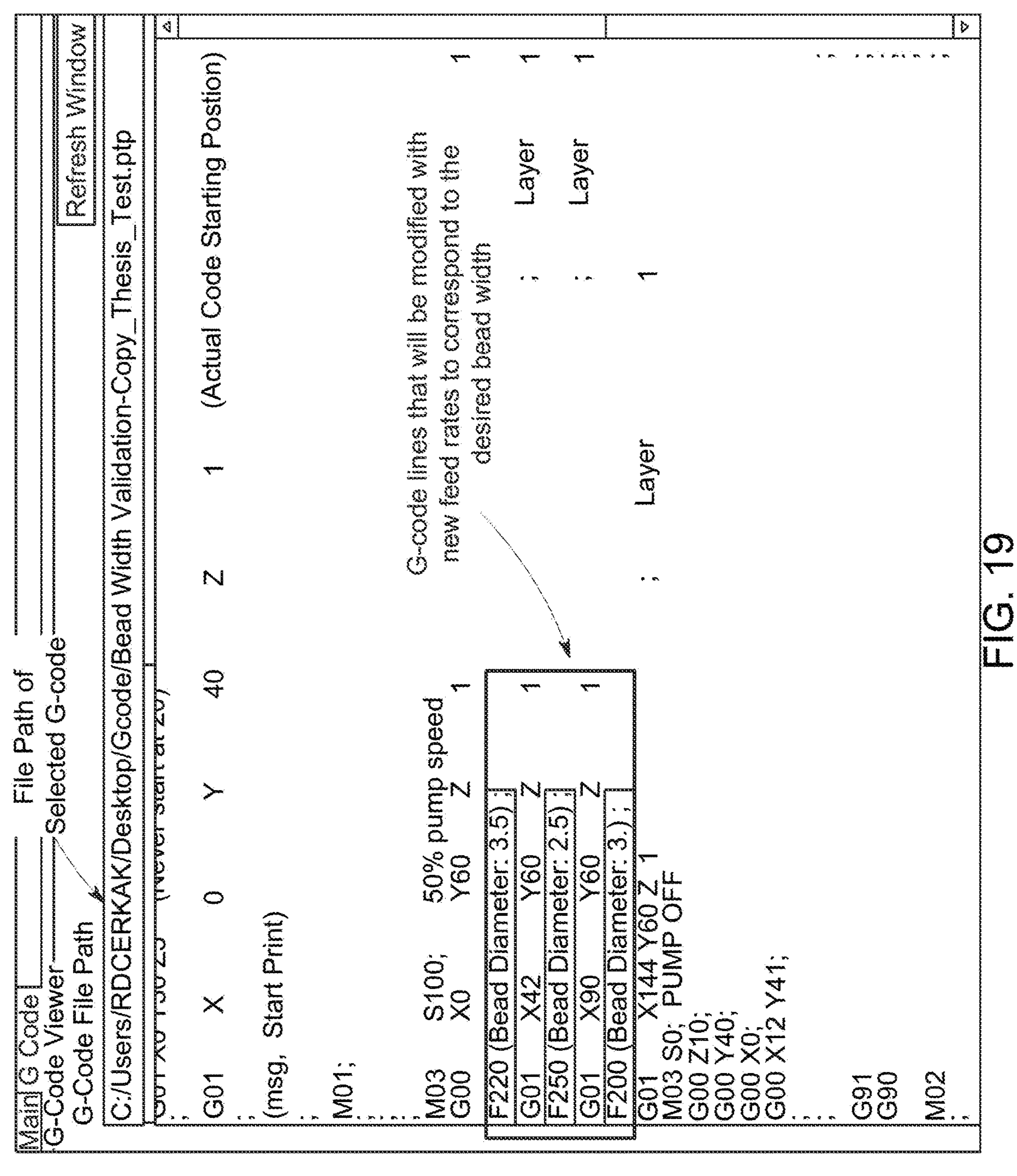
FIG. 19 shows an example of the G-code lines that are to be modified with new feed rates that correspond to the desired bead width inside the parenthesis comment.
Figure 20:
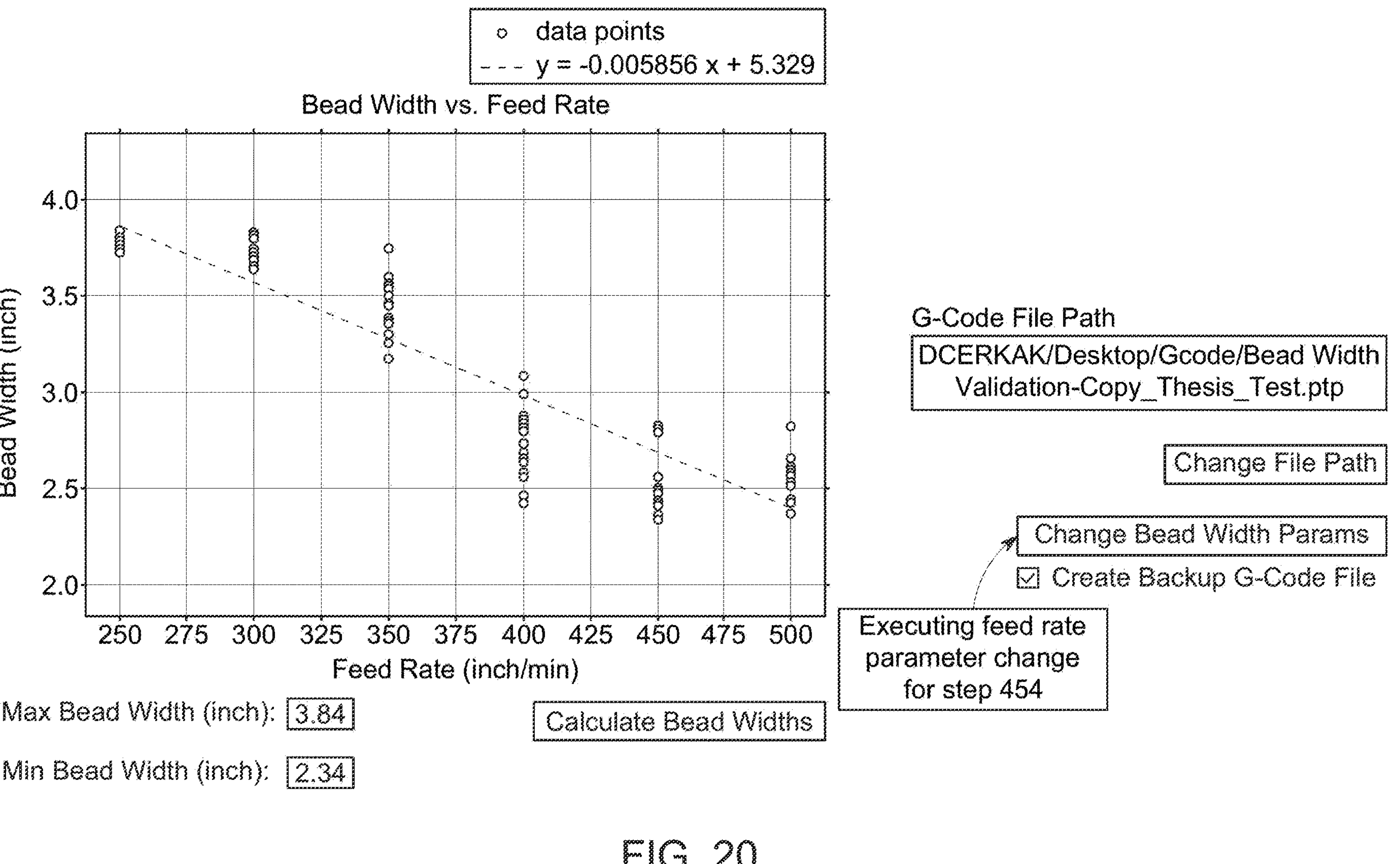
FIG. 20 highlights the "Change Bead Width Params" button on the GUI of FIG. 16 that executes the feed rate parameter change in step 454 using the process map.
Figure 21:
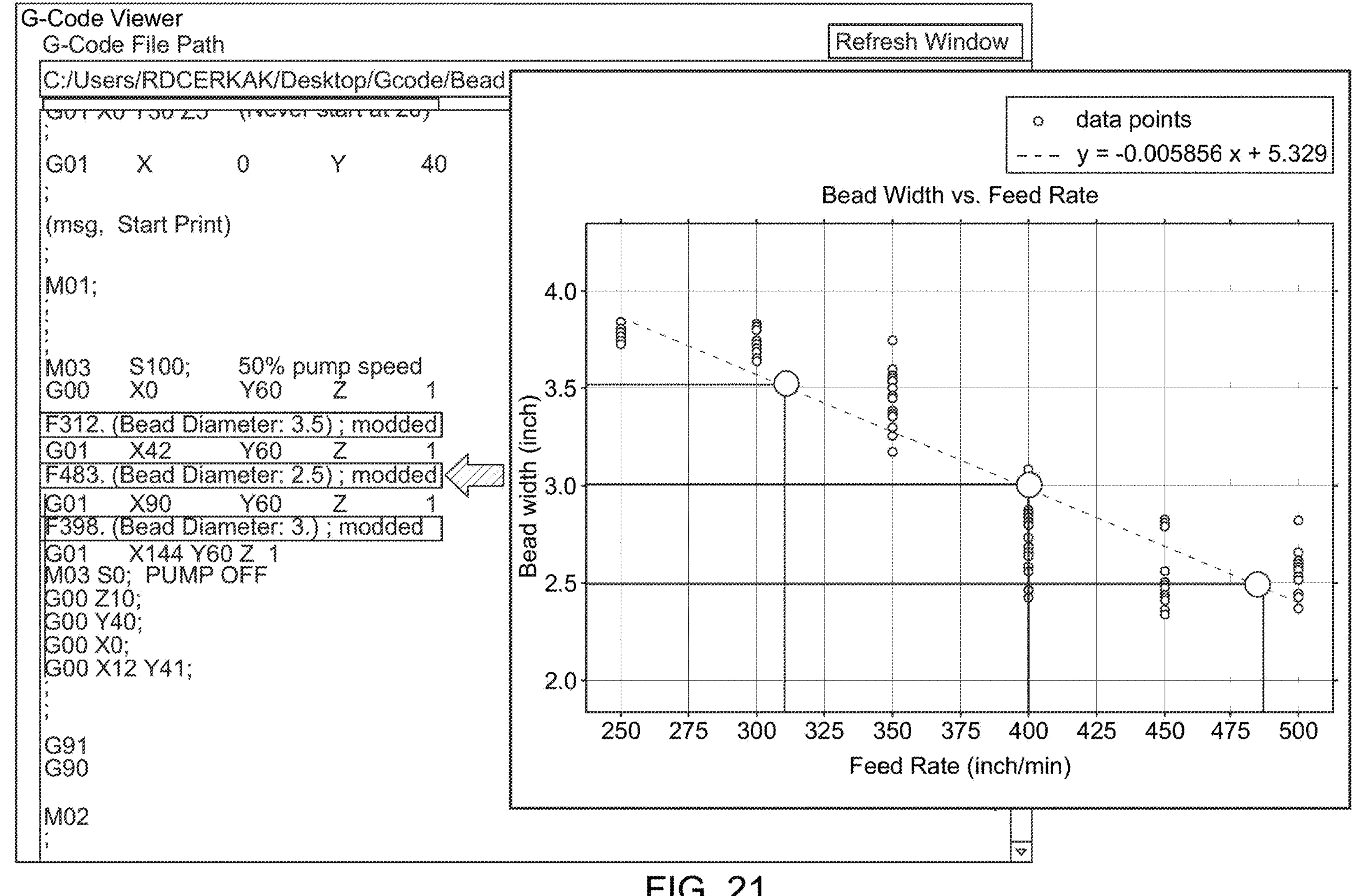
FIG. 21 shows the modified feed rates in the G-code that are calculated from the highlighted points shown in the process map on the GUI of FIG. 16.

FIGS. 19-21 show a process of the feed rate parameter change. More specifically, FIG. 19 shows an example of the G-code lines that are to be modified with new feed rates that correspond to the desired bead width inside the parenthesis comment. The GUI shows the file path of the selected G-code. The figure highlights the G-code lines that will be modified with the new feed rates to correspond to the desired bead width. FIG. 20 highlights the "Change Bead Width Params" button on the GUI of FIG. 16 that executes the feed rate parameter change in step 454 using the process map. FIG. 21 shows the modified feed rates in the G-code that are calculated from the highlighted points shown in the process map on the GUI of FIG. 16.

FIG. 22 shows a diagram illustrating an example of a calibration print (First Print: Calibration Bead) and a diagram illustrating an example of a validation print (Second Print: Validation Bead) by adjusting the gantry feed rate as the result of changing the desired bead width from 3.5" to 2.5" to 3.0" according to the graphical plot of FIG. 18. The calibration print is printed and scanned using the scanning apparatus 730. After scanning, the operator uses the GUI of FIG. 16 to generate a process map of the calibration print. From the process map, the operator uses the GUI to modify the feed rate parameters of the validation bead G-code, according to the desired widths in FIG. 18. The operator then runs the validation bead print. In some embodiments, the validation bead is printed out of the cement-based material using the additive manufacturing software with merged information to control the 3D printer and a validation bead width profile, the bead width of the validation bead is measured, and the measured bead width of the validation bead is compared with the validation bead width profile (e.g., from 3.5" to 2.5" to 3.0") to quantify accuracy of the validation bead.

Figure 23:
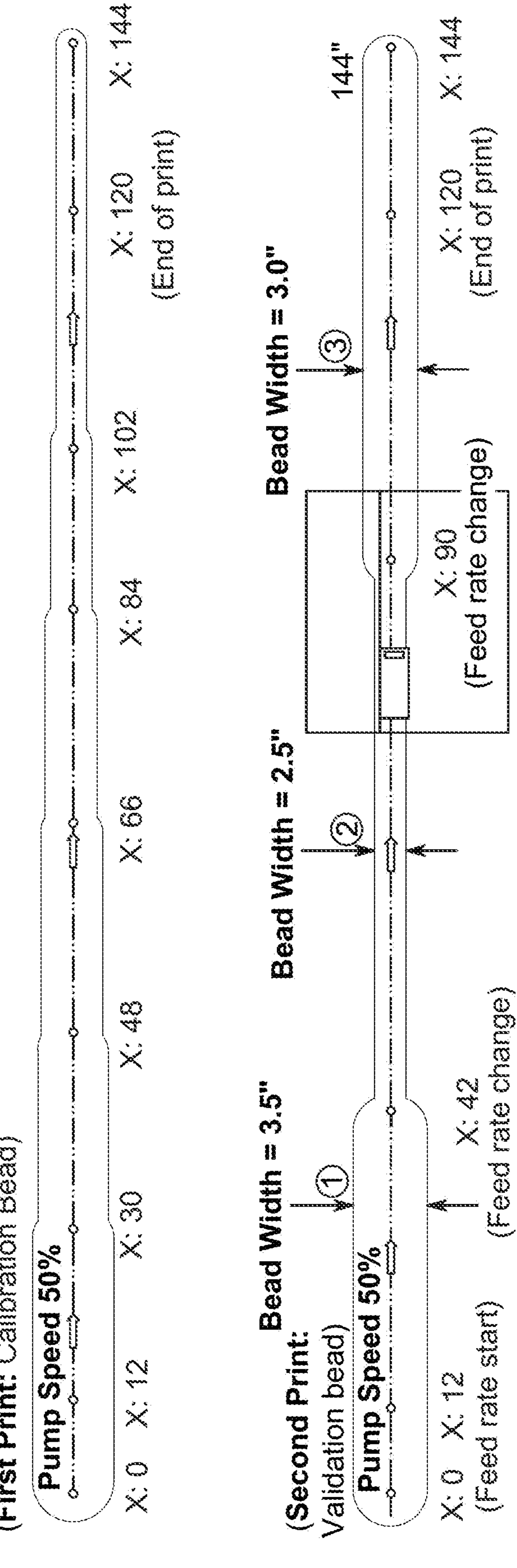
FIG. 23 shows a diagram illustrating an example of scanning the validation print to verify results of the print (Second Print: Validation Bead) of FIG. 22.

FIG. 23 shows a diagram illustrating an example of scanning the validation print to verify results of the print (Second Print: Validation Bead) of FIG. 22. The operator scans the validation bead print with the scanning apparatus 730. Because the validation bead is the same length as the calibration print, the scanner apparatus 730 has no issue generating bead width data along the entire print.

Figure 24:
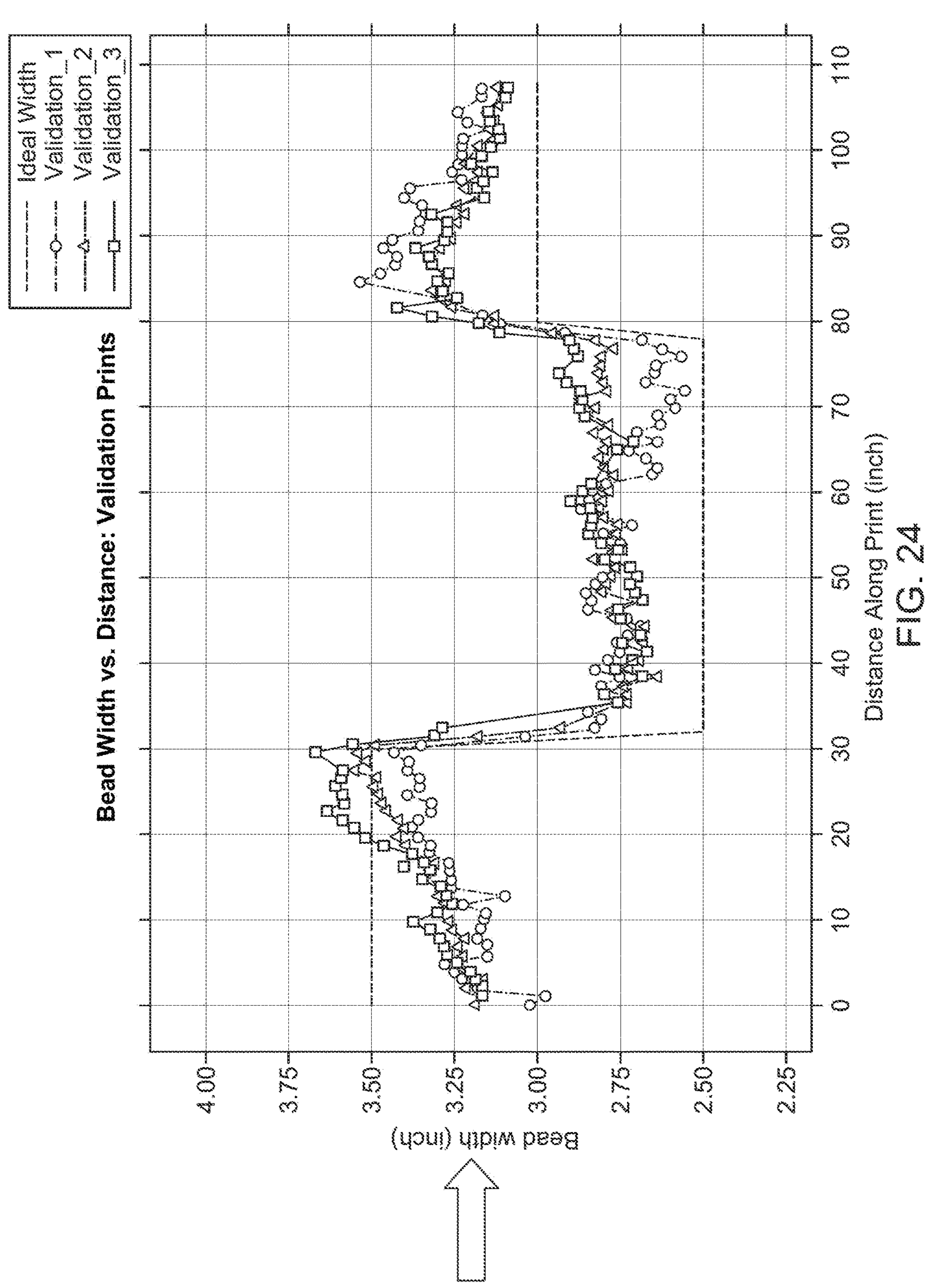
FIG. 24 is a graphical plot of bead width versus distance along the validation prints illustrating the result of achieving a desired bead width, from 3.5" to 2.5" to 3.0", within +/−¼" on average for three separate validation prints.

FIG. 24 is a graphical plot of bead width versus distance along the validation prints illustrating the result of achieving a desired bead width, from 3.5" to 2.5" to 3.0", within +/−¼"

on average. This validation experiment was performed three times to verify that the control system could accurately print.

Figure 25:
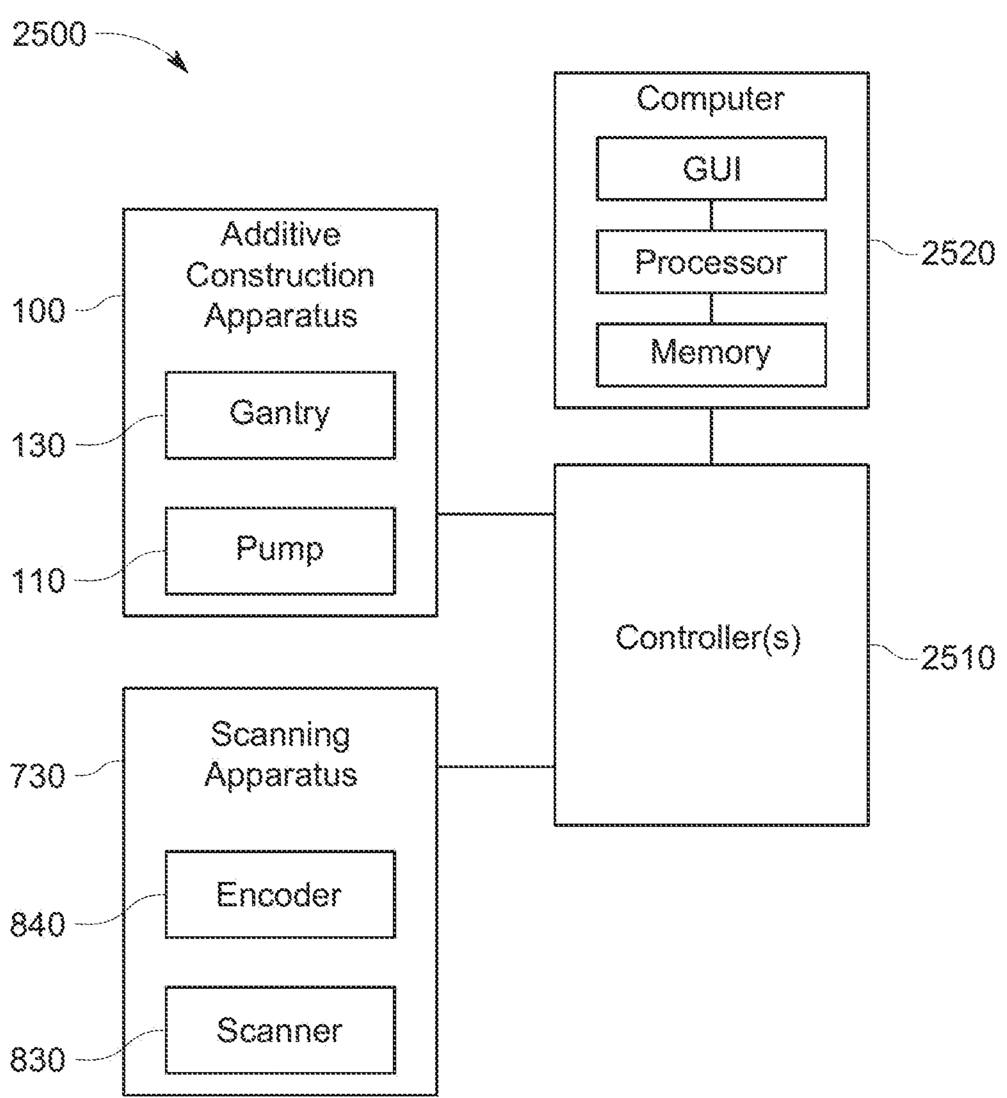
FIG. 25 is a block diagram schematically illustrating an additive construction system.

FIG. 25 is a block diagram schematically illustrating an additive construction system 2500. The system 2500 includes the additive construction apparatus or 3D printing apparatus 100 having the pump 110 and the gantry 130. It includes the scanning apparatus 730 having the scanner 830 and the encoder apparatus 840. A controller 2510 is configured to control operation of the additive construction apparatus 100 including the pump 110 (e.g., pump speed) and the gantry (e.g., gantry feed rate) and the scanning apparatus 730 including the scanner 830 (e.g., scanning) and the encoder apparatus 840 (e.g., incremental encoding in automation scanning). A computer 2520 is used to receive input via a GUI and includes a processor and a memory to store and execute software including additive manufacturing software (e.g., machine G-code) to perform computer control of the components of the additive construction system 2500.

Figure 26:
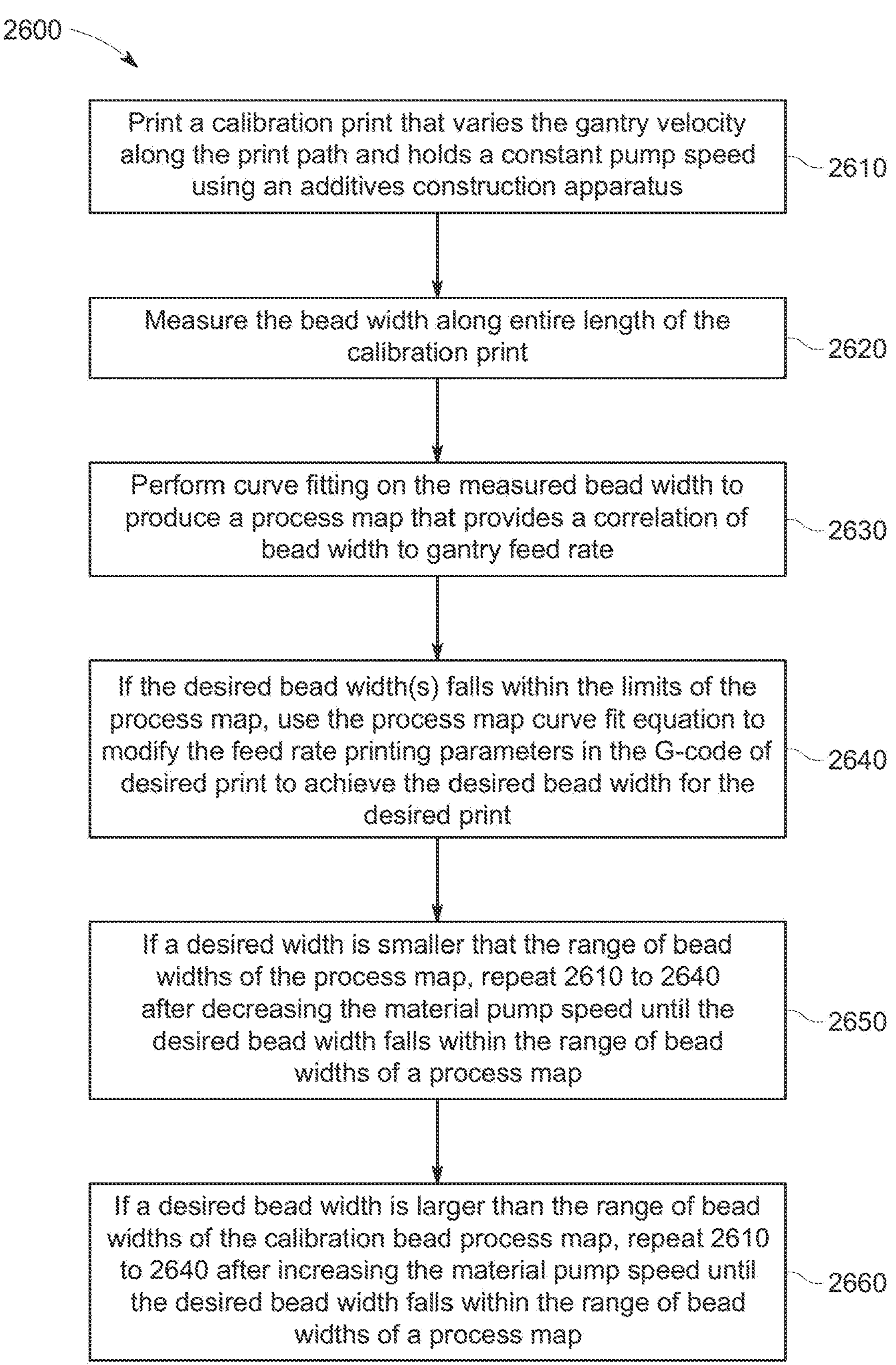
FIG. 26 is a flow diagram illustrating an example of an additive construction process using the additive construction system of FIG. 25.

FIG. 26 is a flow diagram 2600 illustrating an example of an additive construction process using the additive construction system 2500 of FIG. 25. In step 2610, a calibration print is printed using the additive construction apparatus 100 operating at a gantry feed rate and a material pump speed under control of an additive manufacturing software to dispense the material for the calibration print. In specific embodiments, the material is a cement-based material and the gantry velocity is varied along the print path to perform the calibration print at a constant pump speed of the material. Step 2620 involves measuring a bead width along the entire length of the printed calibration print. Step 2630 involves performing curve fitting on bead width measurements of the bead width to produce a calibration print process map to provide a calibration print correlation of the bead width to gantry feed rate. By performing a curve fitting operation on the bead width measurements, the system generates a printer feed rate process map that correlates the bead width to the feed rate of the additive construction apparatus, therefore, allowing the operator to modify the G-code of the next object to be printed that requires defined or variable bead widths.

If a desired bead width(s) for an actual construction falls within a range of bead widths of the calibration print process map, step 2640 involves using the calibration print to modify the additive manufacturing software for operating the additive construction apparatus to perform the actual additive construction. It may use the process map curve fit equation to modify the feed rate printing parameters in the G-code of the desired print to achieve the desired bead width for the desired print. In some embodiments, if all of one or more desired bead widths for an additive construction print fall within the range of bead widths of the calibration print process map, step 2640 includes merging information of the calibration print process map into the additive manufacturing software if all of the one or more desired bead widths fall within the range of bead widths of the calibration print process map, and controlling the 3D printer automatically using the additive manufacturing software with merged information to perform bead width manipulation for the additive construction print.

If a desired bead width is smaller than a range of bead widths of the calibration print process map, step 2650 involves repeating steps 2610 to 2640 after decreasing the material pump speed until the desired bead width falls within the range of bead widths of a modified calibration print process map, so as to perform the actual additive construction. If a desired bead width is larger than a range of bead widths of the calibration print process map, step 2660 involves repeating steps 2610 to 2640 after increasing the material pump speed until the desired bead width falls within the range of bead widths of a modified calibration print process map, so as to perform the actual additive construction.

If the single desired bead width does not fall within the desired dimensional range on the process map, there is an iterative portion of the above bead width calibration print step wherein the above steps (2610 to 2640) are performed again with the concrete pumping system speed either increased or decreased, as the case may be, to result in a single desired bead width, or, alternately, this iterative method in accordance with an embodiment of the invention may be used to generate multiple desired bead widths and multiple corresponding process maps that correlate bead width and gantry feed rate. Steps 2650 and 2660 present one such example. In some embodiments, if any of the one or more desired bead widths for the additive construction print does not fall within the range of bead widths of the calibration print process map, steps 2650 and 2660 each include modifying a pump speed of pumping the cement-based material to the 3D printer and repeating the printing, measuring, performing steps to produce a modified calibration print process map to provide a modified calibration print correlation until all of the one or more desired bead widths fall within the range of bead widths of the calibration print process map and one or more ranges of bead widths of one or more modified calibration print process maps, merging information of multiple calibration print process maps (i.e., the calibration print process map and one or more modified calibration print process maps) into the additive manufacturing software, and controlling the 3D printer automatically using the additive manufacturing software with merged information to perform bead width manipulation for the additive construction print.

Figure 27:
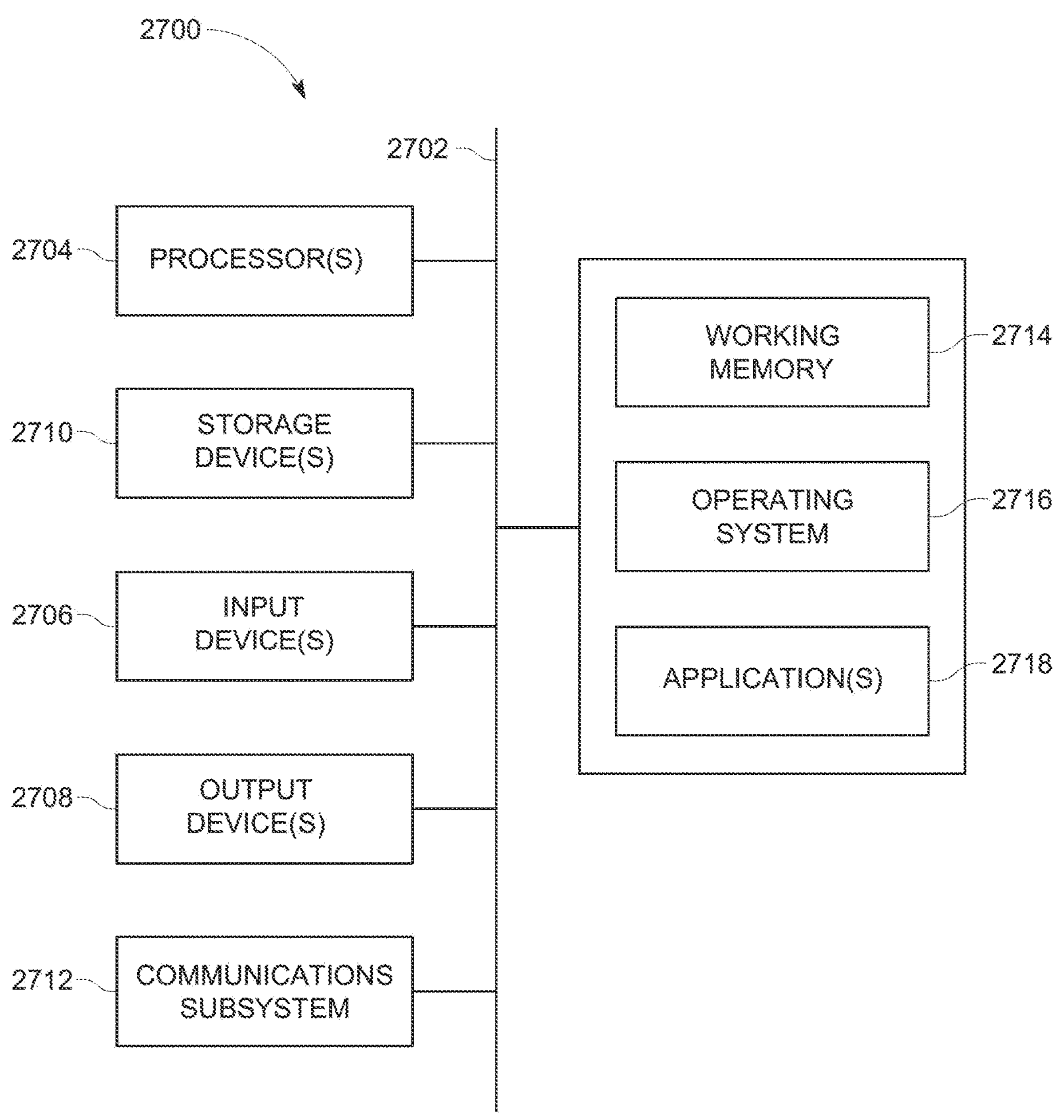
FIG. 27 depicts an exemplary computer system or device configured for use with the additive construction system of FIG. 25 according to an embodiment of the present invention.

FIG. 27 depicts an exemplary computer system or device configured for use with the additive construction system 2500 of FIG. 25 according to an embodiment of the present invention. It may be used to carry out the additive construction process 2600 of FIG. 26 according to an embodiment of the present invention. The computer device 2700 of FIG. 27 is shown comprising hardware elements that may be electrically coupled via a bus 2702 (or may otherwise be in communication, as appropriate). The hardware elements may include a processing unit with one or more processors 2704, including without limitation one or more general-purpose processors and/or one or more special-purpose processors (such as digital signal processing chips, graphics acceleration processors, and/or the like); one or more input devices 2706, which may include without limitation a remote control, a mouse, a keyboard, and/or the like; and one or more output devices 2708, which may include without limitation a presentation device (e.g., controller screen), a printer, and/or the like. Input to the computer system 2700, such as desired printing parameters input into the machine G-code, may be provided by analog-to-digital converters and any other measurement devices into digital form for storage and/or processing. Separate external analog-to-digital devices can be attached to the bus 2702 or communication subsystem 2712 to provide measurements in digital form to the computer system 2700. In some cases, an output device 2708 may include, for example, a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide a non-visual display such as via audio output devices. In general, use of the term "output device" is intended to include a variety of conventional and proprietary devices and ways to output information from computer system 2700 to a user. Output from the computer system 2700 may be provided to digital-to-analog converters to send control signals from the computer to the delivery valves 240 (and optionally the temperature control unit 290 and/or the gate valve 218) and any other mechanisms used in other embodiments. Digitally controlled motors or actuators may be attached to the bus 2702 or communication subsystem 2712 for digital control by the computer.

The computer system 2700 may further include (and/or be in communication with) one or more non-transitory storage devices 2710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 2700 can also include a communications subsystem 2712, which may include without limitation a modem, a network card (wireless and/or wired), an infrared communication device, a wireless communication device and/or a chipset such as a Bluetooth device, 802.11 device, Wi-Fi device, WiMAX device, cellular communication facilities such as GSM (Global System for Mobile Communications), W-CDMA (Wideband Code Division Multiple Access), LTE (Long Term Evolution), and the like. The communications subsystem 2712 may permit data to be exchanged with a network (such as the network described below, to name one example), other computer systems, controllers, and/or any other devices described herein. In many embodiments, the computer system 2700 can further comprise a working memory 2714, which may include a random access memory and/or a read-only memory device, as described above.

The computer device 2700 also can comprise software elements, shown as being currently located within the working memory 2714, including an operating system 2716, device drivers, executable libraries, and/or other code, such as one or more application programs 2718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code can be stored on a non-transitory computer-readable storage medium, such as the storage device(s) 2710 described above. In some cases, the storage medium might be incorporated within a computer system, such as computer system 2700. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 2700 and/or might take the form of source and/or installable code, which, upon compilation and/or installation on the computer system 2700 (e.g., using any of a variety of generally available compilers, installation programs, compression/decompression utilities, and the like), then takes the form of executable code.

It is apparent that substantial variations may be made in accordance with specific requirements. For example, customized hardware might also be used, and/or particular elements might be implemented in hardware, software (including portable software, such as applets, and the like), or both. Further, connection to other computing devices such as network input/output devices may be employed.

As mentioned above, in one aspect, some embodiments may employ a computer system (such as the computer device 2700) to perform methods in accordance with various embodiments of the disclosure. According to a set of embodiments, some or all of the procedures of such methods are performed by the computer system 2700 in response to processor 2704 executing one or more sequences of one or more instructions (which might be incorporated into the operating system 2716 and/or other code, such as an application program 2718) contained in the working memory 2714. Such instructions may be read into the working memory 2714 from another computer-readable medium, such as one or more of the storage device(s) 2710. Merely by way of example, execution of the sequences of instructions contained in the working memory 2714 may cause the processor(s) 2704 to perform one or more procedures of the methods described herein.

The terms "machine-readable medium" and "computer-readable medium," as used herein, can refer to any non-transitory medium that participates in providing data that causes a machine to operate in a specific fashion. In an embodiment implemented using the computer device 2700, various computer-readable media might be involved in providing instructions/code to processor(s) 2704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 2710. Volatile media may include, without limitation, dynamic memory, such as the working memory 2714.

Exemplary forms of physical and/or tangible computer-readable media may include a floppy disk, a flexible disk, hard disk, magnetic tape, or any other magnetic medium, a compact disc, any other optical medium, ROM, RAM, and the like, any other memory chip or cartridge, or any other medium from which a computer may read instructions and/or code. Various forms of computer-readable media may be involved in carrying one or more sequences of one or more instructions to the processor(s) 2704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 2700.

The communications subsystem 2712 (and/or components thereof) generally can receive signals, and the bus 2702 then can carry the signals (and/or the data, instructions, and the like, carried by the signals) to the working memory 2714, from which the processor(s) 2704 retrieves and executes the instructions. The instructions received by the working memory 2714 may optionally be stored on a non-transitory storage device 2710 either before or after execution by the processor(s) 2704.

It should further be understood that the components of computer device 2700 can be distributed across a network. For example, some processing may be performed in one location using a first processor while other processing may be performed by another processor remote from the first processor. Other components of computer system 2700 may be similarly distributed. As such, computer device 2700 may be interpreted as a distributed computing system that performs processing in multiple locations. In some instances, computer system 2700 may be interpreted as a single computing device, such as a distinct laptop, desktop computer, or the like, depending on the context.

A processor may be a hardware processor such as a central processing unit (CPU), a graphic processing unit (GPU), or a general-purpose processing unit. A processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 612-bit, 256-bit, 128-bit, 64-bit, 32-bit, or 16-bit data operations.

Each of the calculations or operations discussed herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described herein. All features of the described systems are applicable to the described methods mutatis mutandis, and vice versa. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. While the exemplary embodiments have been described in some detail, by way of example and for clarity of understanding, those of skill in the art will recognize that a variety of modification, adaptations, and changes may be employed.

As will be appreciated by one of ordinary skill in the art, the present invention may be embodied as an apparatus (including, for example, a system, a machine, a device, and/or the like), as a method (including, for example, a business process, and/or the like), as a computer-readable storage medium, or as any combination of the foregoing.

The inventive concepts taught by way of the examples discussed above are amenable to modification, rearrangement, and embodiment in several ways. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation.

The indication of any elements or steps as "optional" does not indicate that all other or any other elements or steps are mandatory. The claims define the invention and form part of the specification. Limitations from the written description are not to be read into the claims.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method of additive construction, comprising:

printing a calibration print out of a cement-based material using a 3-Dimensional (3D) printer having a pump to pump the cement-based material to the 3D printer and having a gantry operating at a gantry feed rate under control of an additive manufacturing software to dispense the cement-based material;

measuring a bead width along a length of the calibration print;

performing curve fitting on bead width measurements of the bead width to produce a calibration print process map that correlates the bead width of the calibration print to the gantry feed rate of the 3D printer to provide a calibration print correlation, the calibration print process map including a range of bead widths between a minimum bead width and a maximum bead width alongside a best fit curve to the bead width measurements to provide the calibration print correlation;

in response to all of one or more desired bead widths for an additive construction print falling within the range of bead widths of the calibration print process map, using the calibration print correlation to modify bead width parameters of the additive manufacturing software for operating the 3D printer to perform bead width manipulation for the additive construction print; and in response to any of the one or more desired bead widths for the additive construction print not falling within the range of bead widths of the calibration print process map, modifying a pump speed of pumping the cement-based material to the 3D printer and repeating the printing, measuring, performing steps to produce a modified calibration print process map to provide a modified calibration print correlation until all of the one or more desired bead widths fall within the range of bead widths of the calibration print process map and one or more ranges of bead widths of one or more modified calibration print process maps, and using the calibration print correlation and one or more modified calibration print correlations of the one or more modified calibration print process maps to modify bead width parameters of the additive manufacturing software for operating 3D printer to perform bead width manipulation for the additive construction print.

2. The method of claim 1, further comprising:

merging information of the calibration print process map into the additive manufacturing software if all of the one or more desired bead widths fall within the range of bead widths of the calibration print process map, and controlling the 3D printer automatically using the additive manufacturing software with merged information to perform bead width manipulation for the additive construction print; and merging information of the calibration print process map and the one or more modified calibration print process maps into the additive manufacturing software if any of the one or more desired bead widths does not fall within the range of bead widths of the calibration print process map, and controlling the 3D printer automatically using the additive manufacturing software with merged information to perform bead width manipulation for the additive construction print.

3. The method of claim 2, further comprising:

printing a validation bead out of the cement-based material using the additive manufacturing software with merged information to control the 3D printer and a validation bead width profile; and measuring the bead width of the validation bead; and comparing the measured bead width of the validation bead and the validation bead width profile to quantify accuracy of the validation bead.

4. The method of claim 1, wherein printing the calibration print comprises:

pumping the cement-based material at a constant pump speed; and increasing the gantry feed rate from a start of printing the calibration print to an end of printing the calibration print to produce the bead width of the calibration print which decreases from the start to the end of printing the calibration print.

5. The method of claim 1, further comprising:

scanning the calibration print to measure the bead width along a length of the calibration print.

6. The method of claim 5, wherein the calibration print is scanned using a 3D scanning apparatus at intervals of distance along the length of the calibration print.

7. The method of claim 1, detecting user input to show the calibration print process map;

in response to detecting the user input the show the calibration print process map, displaying the calibration print process map on a display device; and if all of the one or more desired bead widths for the additive construction print fall within the range of bead widths of the calibration print process map, detecting user input to change bead width parameters for the additive construction print to be performed; and, in response to detecting the user input to change bead width parameters, using the calibration print correlation to modify bead width parameters of the additive manufacturing software for operating the 3D printer to perform bead width manipulation for the additive construction print.

8. An electronic device having one or more processors and a memory storing one or more programs to be executed by the one or more processors, the one or more programs including instructions for:

producing a calibration print process map that correlates a bead width of a calibration print to a gantry feed rate of a gantry of a 3-Dimensional (3D) printer to provide a calibration print correlation from curve fitting on bead width measurements of the bead width which have been measured along a length of the calibration print versus the gantry feed rate, for a calibration print of printing the calibration print out of a cement-based material using the 3D printer having the cement-based material pumped to the 3D printer and having the gantry operating at the gantry feed rate under control of an additive manufacturing software to dispense the cement-based material, the bead width having been measured along a length of the calibration print, the calibration print process map including a range of bead widths between a minimum bead width and a maximum bead width;

in response to all of one or more desired bead widths for an additive construction print falling within the range of bead widths of the calibration print process map, using the calibration print correlation to modify bead width parameters of the additive manufacturing software for operating the 3D printer to perform bead width manipulation for the additive construction print; and in response to any of the one or more desired bead widths for the additive construction print not falling within the range of bead widths of the calibration print process map, modifying a pump speed of pumping the cement-based material to the 3D printer and repeating the printing, measuring, performing steps to produce a modified calibration print process map to provide a modified calibration print correlation until all of the one or more desired bead widths fall within the range of bead widths of the calibration print process map and one or more ranges of bead widths of one or more modified calibration print process maps, and using the calibration print correlation and one or more modified calibration print correlations of the one or more modified calibration print process maps to modify bead width parameters of the additive manufacturing software for operating the 3D printer to perform bead width manipulation for the additive construction print.

9. The electronic device of claim 8, wherein the one or more programs include instructions for:

merging information of the calibration print process map into the additive manufacturing software if all of the one or more desired bead widths fall within the range of bead widths of the calibration print process map, and controlling the 3D printer automatically using the additive manufacturing software with merged information to perform bead width manipulation for the additive construction print; and merging information of the calibration print process map and the one or more modified calibration print process maps into the additive manufacturing software if any of the one or more desired bead widths does not fall within the range of bead widths of the calibration print process map, and controlling the 3D printer automatically using the additive manufacturing software with merged information to perform bead width manipulation for the additive construction print.

10. The electronic device of claim 8, wherein the one or more programs include instructions for:

comparing a measured bead width of a validation bead, which has been printed out of the cement-based material using the additive manufacturing software with merged information to control the 3D printer and a validation bead width profile, and the validation bead width profile to quantify accuracy of the validation bead.

11. The electronic device of claim 8, further comprising a display device, wherein the one or more programs include instructions for:

detecting user input to show the calibration print process map;

in response to detecting the user input the show the calibration print process map, displaying the calibration print process map on the display device; and if all of the one or more desired bead widths for the additive construction print fall within the range of bead widths of the calibration print process map, detecting user input to change bead width parameters for the additive construction print to be performed; and, in response to detecting the user input to change bead width parameters, using the calibration print correlation to modify bead width parameters of the additive manufacturing software for operating the 3D printer to perform bead width manipulation for the additive construction print.

12. The electronic device of claim 11, wherein the one or more programs include instructions for:

if any of the one or more desired bead widths for the additive construction print does not fall within the range of bead widths of the calibration print process map, receiving user input to modify the pump speed of pumping the cement-based material to the 3D printer for repeating the printing, measuring, and performing steps to produce a modified calibration print process map to provide a modified calibration print correlation until all of the one or more desired bead widths fall within the range of bead widths of the calibration print process map and one or more ranges of bead widths of the one or more modified calibration print process maps.

13. A method for additive construction using an electronic device having a display device, the method comprising:

detecting user input to show a calibration print process map that correlates a bead width of a calibration print to a gantry feed rate of a gantry of a 3-Dimensional (3D) printer to provide a calibration print correlation, for a calibration print of printing the calibration print out of a cement-based material using the 3D printer having a pump to pump the cement-based material to the 3D printer and having the gantry operating at the gantry feed rate under control of an additive manufacturing software to dispense the cement-based material, the bead width having been measured along a length of the calibration print;

in response to detecting the user input the show the calibration print process map, displaying the calibration print process map which includes a range of bead widths from a minimum bead with and a maximum bead width of the calibration print, and the calibration print correlation from curve fitting on bead width measurements of the bead width which have been measured along the length of the calibration print versus the gantry feed rate;

in response to all of one or more desired bead widths for the additive construction print falling within the range of bead widths of the calibration print process map, detecting user input to change bead width parameters for the additive construction print to be performed; and, in response to detecting the user input to change bead width parameters, using the calibration print correlation to modify bead width parameters of the additive manufacturing software for operating the 3D printer to perform bead width manipulation for the additive construction print; and in response to any of the one or more desired bead widths for the additive construction print not falling within the range of bead widths of the calibration print process map, receiving user input to modify a pump speed of pumping the cement-based material to the 3D printer for repeating: printing a modified calibration print out of the cement-based material, measuring a bead width along the length of the modified calibration print, performing curve fitting on bead width measurements of the bead width of the modified calibration print versus the gantry feed rate to produce a modified calibration print process map to provide a modified calibration print correlation, until all of the one or more desired bead widths fall within the range of bead widths of the calibration print process map and one or more ranges of bead widths of one or more modified calibration print process maps, the calibration print correlation and one or more modified calibration print correlations of the one or more modified calibration print process maps to be used to modify bead width parameters of the additive manufacturing software for operating the 3D printer to perform bead width manipulation for the additive construction print.

14. The method of claim 13, further comprising:

merging information of the calibration print process map into the additive manufacturing software if all of the one or more desired bead widths fall within the range of bead widths of the calibration print process map, and controlling the 3D printer automatically using the additive manufacturing software with merged information to perform bead width manipulation for the additive construction print; and merging information of the calibration print process map and the one or more modified calibration print process maps into the additive manufacturing software if any of the one or more desired bead widths does not fall within the range of bead widths of the calibration print process map, and controlling the 3D printer automatically using the additive manufacturing software with merged information to perform bead width manipulation for the additive construction print.

15. The method of claim 13, further comprising:

comparing a measured bead width of a validation bead, which has been printed out of the cement-based material using the additive manufacturing software with merged information to control the 3D printer and a validation bead width profile, and the validation bead width profile to quantify accuracy of the validation bead.

16. The method of claim 13, further comprising:

printing the calibration print out of the cement-based material using the 3D printer having the pump and the gantry operating under control of the additive manufacturing software to dispense the cement-based material; and measuring the bead width along the length of the calibration print.

17. The method of claim 16, wherein printing the calibration print comprises:

pumping the cement-based material at a constant pump speed; and increasing the gantry feed rate from a start of printing the calibration print to an end of printing the calibration print to produce the bead width of the calibration print which decreases from the start to the end of printing the calibration print.

18. The method of claim 16, further comprising:

scanning the calibration print to measure the bead width along a length of the calibration print.

19. The method of claim 18, wherein the calibration print is scanned using a 3D scanning apparatus at intervals of distance along the length of the calibration print.

20. The method of claim 13, further comprising:

performing the additive construction using the additive manufacturing software with the modified bead width parameters.

* * * * *